(12) United States Patent
Ye et al.

(10) Patent No.: US 12,455,223 B2
(45) Date of Patent: Oct. 28, 2025

(54) CELL IMAGE ANALYSIS DEVICE AND SAMPLE ANALYSIS METHOD

(71) Applicant: Shenzhen Mindray Bio-Medical Electronics Co., Ltd., Shenzhen (CN)

(72) Inventors: Bo Ye, Shenzhen (CN); Bin Jiang, Shenzhen (CN); Wei Luo, Shenzhen (CN); Yuan Xing, Shenzhen (CN); Huan Qi, Shenzhen (CN); Qiaoni Chen, Shenzhen (CN); Shan Yu, Shenzhen (CN); Yi Ye, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 348 days.

(21) Appl. No.: 17/847,074

(22) Filed: Jun. 22, 2022

(65) Prior Publication Data
US 2022/0326140 A1    Oct. 13, 2022

Related U.S. Application Data

(63) Continuation of application No. PCT/CN2020/142018, filed on Dec. 31, 2020.

(51) Int. Cl.
*G01N 15/1433* (2024.01)
*G01N 15/01* (2024.01)
*G06T 7/00* (2017.01)

(52) U.S. Cl.
CPC ....... *G01N 15/1433* (2024.01); *G06T 7/0012* (2013.01); *G01N 15/01* (2024.01);
(Continued)

(58) Field of Classification Search
CPC ............... G01N 15/1433; G01N 15/01; G01N 2015/012; G01N 2015/016;
(Continued)

(56) References Cited

U.S. PATENT DOCUMENTS

| | | | |
|---|---|---|---|
| 7,796,797 B2 * | 9/2010 | Nakaya | G01N 15/147 382/134 |
| 7,936,912 B2 * | 5/2011 | Tohma | B01L 9/52 382/133 |

(Continued)

FOREIGN PATENT DOCUMENTS

| | | | | |
|---|---|---|---|---|
| CN | 1945326 A | * | 4/2007 | ......... G01N 15/1459 |
| CN | 101339185 A | * | 1/2009 | |

(Continued)

*Primary Examiner* — Stephen R Koziol
*Assistant Examiner* — Benedict E Lee
(74) *Attorney, Agent, or Firm* — Syncoda LLC; Feng Ma

(57) ABSTRACT

Provided are cell image analysis devices and sample analysis methods. A sample smear of a test sample is imaged by an imaging device in an assigned analysis mode to obtain first cell images of the test sample, which are identified and analyzed by a control device. If it is identified that there is preset abnormality in the sample smear, an analysis mode different from the assigned analysis mode and corresponding to the present abnormality is determined as an additional analysis mode, and the imaging device is controlled to image the sample smear in the additional analysis mode. The additional analysis mode matches with the preset abnormality, so that the imaging device is allowed to obtain cell images in the additional analysis mode, to identify and analyze the cell images matching the preset abnormality, thereby increasing processing efficiency and accuracy of processing result.

18 Claims, 7 Drawing Sheets

(52) U.S. Cl.
CPC .............. *G06T 2207/10056* (2013.01); *G06T 2207/30024* (2013.01)

(58) Field of Classification Search
CPC ..... G01N 2015/018; G01N 2015/0294; G01N 15/0227; G01N 2015/1486; G01N 15/1425; G01N 15/1429; G01N 2015/1006; G01N 2015/1497; G01N 21/84; G01N 33/48; G06T 7/0012; G06T 2207/10056; G06T 2207/30024; G06T 2207/20021; G06T 2207/30242; G06T 2207/10152
See application file for complete search history.

(56) References Cited

U.S. PATENT DOCUMENTS

| | | | | |
|---|---|---|---|---|
| 9,176,043 | B2 * | 11/2015 | Takagi | G06T 7/11 |
| 10,585,032 | B2 * | 3/2020 | Fukuda | G01N 15/1436 |
| 11,099,175 | B2 * | 8/2021 | Zait | G01N 33/721 |
| 11,276,165 | B2 * | 3/2022 | Thagaard | G06T 7/33 |
| 11,733,150 | B2 * | 8/2023 | Eshel | G01N 1/30 382/134 |
| 2007/0020721 | A1 | 1/2007 | Yoshida et al. | |
| 2007/0076190 | A1 | 4/2007 | Nakaya et al. | |
| 2014/0273188 | A1 * | 9/2014 | Mohan | G02B 21/125 422/82.05 |
| 2018/0211380 | A1 * | 7/2018 | Tandon | G06V 20/69 |
| 2020/0209224 | A1 * | 7/2020 | Ye | G01N 33/5094 |

FOREIGN PATENT DOCUMENTS

| | | | | | |
|---|---|---|---|---|---|
| CN | 102305791 | A | * | 1/2012 | |
| CN | 102359938 | A | * | 2/2012 | |
| CN | 102768271 | A | | 11/2012 | |
| CN | 103091286 | A | * | 5/2013 | ............. G01N 21/51 |
| CN | 105136795 | A | | 12/2015 | |
| CN | 103091286 | B | * | 8/2016 | ....... G01N 33/56905 |
| CN | 106875393 | A | * | 6/2017 | .......... G06T 7/0012 |
| CN | 108627656 | A | * | 10/2018 | ............. G01N 35/00 |
| CN | 108844906 | A | | 11/2018 | |
| CN | 108918519 | A | * | 11/2018 | ............. G01N 21/84 |
| CN | 108957018 | A | | 12/2018 | |
| CN | 109035222 | A | * | 12/2018 | ............... G06T 5/10 |
| CN | 105143849 | B | * | 1/2019 | ......... G01N 33/5094 |
| CN | 109313209 | A | | 2/2019 | |
| CN | 109540890 | A | * | 3/2019 | ............. G01N 21/84 |
| CN | 109690562 | A | * | 4/2019 | ............. G06N 3/045 |
| CN | 110231259 | A | | 9/2019 | |
| CN | 110441506 | A | | 11/2019 | |
| CN | 108627656 | B | * | 10/2021 | ............. G01N 35/00 |
| CN | 113358654 | B | * | 7/2022 | ............. G01N 21/01 |
| CN | 109690562 | B | * | 9/2022 | ............. G06N 3/045 |
| EP | 2199776 | A2 | * | 6/2010 | ............... G06T 7/11 |
| JP | H0652263 | B2 | * | 7/1994 | ............. G06V 20/69 |
| JP | 2007024844 | A | * | 2/2007 | ......... G01N 15/1459 |
| JP | 2007093356 | A | | 4/2007 | |
| JP | 4690163 | B2 | * | 6/2011 | |
| JP | 6401776 | B2 | * | 10/2018 | ......... G01N 15/1404 |
| KR | 101741764 | B1 | * | 5/2017 | ............... G06F 17/30 |
| WO | WO-2014206376 | A1 | * | 12/2014 | ....... G01N 33/56972 |
| WO | WO-2016157982 | A1 | * | 10/2016 | ............. G01N 33/52 |
| WO | 2018043958 | A1 | | 3/2018 | |

* cited by examiner

CELL IMAGE ANALYSIS DEVICE AND SAMPLE ANALYSIS METHOD

CROSS-REFERENCE TO RELATED APPLICATIONS

This application is a continuation of International Application No. PCT/CN2020/142018, filed on Dec. 31, 2020, which claims the priority of International Application No. PCT/CN2019/130606, entitled "CELL IMAGE ANALYSIS DEVICE AND SAMPLE ANALYSIS METHOD," and filed on Dec. 31, 2019, both of which are incorporated herein by reference in their entireties.

TECHNICAL FIELD

The disclosure relates to medical equipment technologies and, in particular, to a cell image analysis device and a sample analysis method.

BACKGROUND

At present, a cell image analysis device (also known as cell morphology analyzer or digital microscope) is capable of processing a sample smear in an assigned analysis mode. The processing of the sample smear by the cell image analysis device includes: sample smear loading, monolayer cell and cell positioning, cell image acquisition, cell image identification and analysis, generation of test reports, etc. To a certain extent, the cell image analysis device is capable of working in place of manual microscopy, thereby improving test speed and test accuracy. However, the cell image analysis device can process the sample smear only in the assigned analysis mode.

SUMMARY

The disclosure provides a cell image analysis device and a sample analysis method, in which if an abnormality is found during processing of a sample smear in an assigned analysis mode, an additional analysis mode that matches the abnormality and is different from the assigned analysis mode is automatically added and then used for processing.

To achieve the foregoing objective, the disclosure provides the following technical solutions.

According to a first aspect, the disclosure provides a biological sample analysis system, including:
  a blood cell analysis device configured to test biological samples, to obtain number and type of cells in the biological samples;
  a smear preparation device is configured to receive a sample to be tested, which is selected from the biological samples based on a preset retest condition, and prepare a sample smear from the sample to be tested;
  a cell image analysis device configured to image the sample smear to obtain cell images of the sample to be tested, and identify and analyze the cell images; and
  a control device configured to:
  determine a biological sample, whose test result from the blood cell analysis device meets the preset retest condition, to be the sample to be tested;
  control the sample to be tested to be conveyed to the smear preparation device;
  control the sample smear of the sample to be tested to be conveyed to the cell image analysis device;
  control the cell image analysis device to image the sample smear in an assigned analysis mode to obtain first cell images of the sample to be tested, and to identify and analyze the first cell images; and
  control the cell image analysis device to image the sample smear of the sample to be tested again in an additional analysis mode, if it is identified that there are cells in the first cell images that meet a preset condition, to obtain second cell images of the sample to be tested, wherein the additional analysis mode is an analysis mode that is different from the assigned analysis mode and related to the cells that meet the preset condition.

According to a second aspect, the disclosure provides a cell image analysis device, including:
  an imaging device configured to image a sample smear of a sample to be tested, to obtain cell images of the sample to be tested; and
  a control device configured to:
  control the imaging device to image the sample smear in an assigned analysis mode, to obtain first cell images of the sample to be tested;
  identify and analyze the first cell images obtained in the assigned analysis mode; and
  control the imaging device to image the sample smear of the sample to be tested again in an additional analysis mode, if it is identified that there are cells in the first cell images that meet a preset condition, to obtain second cell images of the sample to be tested, wherein the additional analysis mode is an analysis mode that is different from the assigned analysis mode and related to the cells that meet the preset condition.

According to a third aspect, the disclosure provides a sample analysis method, including:
  testing a sample to be tested by a blood cell analysis device, to obtain a test result of cells in the sample to be tested;
  preparing a sample smear from the sample to be tested by a smear preparation device, when the test result meets a preset retest condition;
  imaging the sample smear by a cell image analysis device in an assigned analysis mode corresponding to the preset retest condition, to obtain first cell images of the sample to be tested, and identifying and analyzing the first cell images; and
  imaging the sample smear by the cell image analysis device again in an additional analysis mode, if it is identified that there are cells in the first cell images that meet a preset condition based on the first cell images, to obtain second cell images of the sample to be tested, wherein the additional analysis mode is an analysis mode that is different from the assigned analysis mode and related to the cells that meet the preset condition.

According to a fourth aspect, the disclosure provides a sample analysis method, including:
  imaging a sample smear of a sample to be tested in an assigned analysis mode, to obtain first cell images of the sample to be tested;
  identifying and analyzing the first cell images obtained in the assigned analysis mode;
  determining an additional analysis mode, if it is identified that there are cells in the first cell images that meet a preset condition, wherein the additional analysis mode is an analysis mode that is different from the assigned analysis mode and related to the cells that meet the preset condition; and
  imaging the sample smear of the sample to be tested again in the additional analysis mode, to obtain second cell images of the sample to be tested.

According to a fifth aspect, the disclosure provides a cell image analysis method for a blood smear, including:

providing a blood smear smeared with a blood film prepared from a blood sample to be tested;

imaging the blood film in an assigned analysis mode, to obtain first cell images;

identifying and analyzing the first cell images; determining whether there are cells in the first cell images that meet a preset condition;

if the determination result is yes, imaging the blood film in an additional analysis mode to obtain second cell images, wherein the additional analysis mode is different from the assigned analysis mode; and if the determination result is no, outputting an identification and analysis result of the first cell images.

According to a sixth aspect, the disclosure provides a storage medium having executable instructions stored thereon, which is configured to cause a processor to execute the executable instructions to implement the foregoing sample analysis method and/or cell image analysis method for a blood smear.

In the disclosure, the imaging device images a sample smear of a sample to be tested in an assigned analysis mode, to obtain first cell images of the sample to be tested; the control device identifies and analyzes the first cell images of the sample to be tested, and upon identifying that there are cells on the sample smear that meet a preset condition, determines an analysis mode different from the assigned analysis mode and corresponding to the cells meeting the preset condition as an additional analysis mode, and the control device controls the imaging device to image the sample smear in the additional analysis mode, to obtain second cell images of the sample to be tested, and identifies and analyzes the same, such that if the cells that meet the preset condition are found during processing of the sample smear in the assigned analysis mode, the additional analysis mode that matches the cells meeting the preset condition is automatically added for further processing of the sample smear, thereby realizing automatic addition and calling of an analysis mode. In addition, the additional analysis mode matches the found cells that meet the preset condition, so that the imaging device can capture the second cell images under the guidance of the additional analysis mode, and identify and analyze the second cell images, thereby improving the processing efficiency and the accuracy of processing results.

BRIEF DESCRIPTION OF THE DRAWINGS

In order to more clearly illustrate the technical solutions in the embodiments of the disclosure or in the prior art, a brief description of the drawings required for the description of the embodiments or the prior art will be provided below. The drawings in the following description illustrate only some of the embodiments of the disclosure, and those of ordinary skill in the art would also be able to obtain other drawings from these drawings without any creative effort.

DESCRIPTION OF THE PREFERRED EMBODIMENTS

In order to make the objectives, technical solutions, and advantages of the disclosure clearer, the disclosure will be further described in detail below with reference to the accompanying drawings. The disclosure should not be construed as being limited to the provided embodiments, instead, the contents described in the embodiments of the disclosure make the disclosure comprehensive and complete, and convey the concept of the embodiments of the disclosure to those skilled in the art. Therefore, other embodiments obtained by those of ordinary skill in the art without involving any creative efforts shall all fall within the scope of protection of the disclosure.

It should be noted that, in the embodiments of the disclosure, the terms "include", "including" or any other variation thereof are intended to cover non-exclusive inclusion, so that a method or device including a series of elements includes not only explicitly stated elements, but also other elements not explicitly listed, or elements inherent in implementing the method or device. In the absence of more restrictions, the element defined by the phrase "including a/an . . . " does not exclude another related element in a method or device that includes the element.

For example, the cell image analysis device provided in the embodiments of the disclosure includes a series of devices, but is not limited to including the explicitly stated devices. Similarly, the sample analysis method provided in the embodiments of the disclosure includes a series of steps, but is not limited to including the stated steps. It should be noted that, "embodiments" are involved in the following description, which describes a subset of all possible embodiments. However, it may be understood that "embodiments" may be the same subset or different subsets of all possible embodiments, and may be combined with each other in the case of no conflict.

Figure 1:
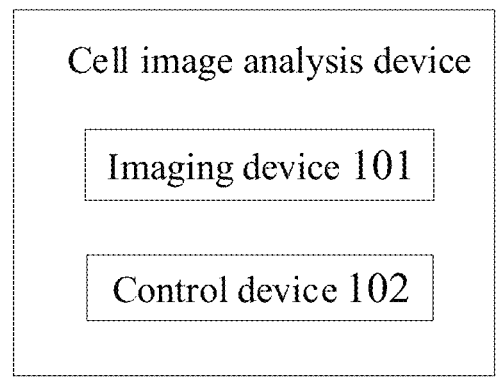
FIG. 1 is a schematic structural diagram of a cell image analysis device according to an embodiment of the disclosure.

FIG. 1 shows an optional structure of a cell image analysis device according to an embodiment of the disclosure. The cell image analysis device may include an imaging device 101 and a control device 102.

The imaging device 101 is configured to image a sample smear of a sample to be tested, to obtain cell images of the sample to be tested.

The control device 102 is configured to:
control the imaging device to image the sample smear in an assigned analysis mode, to obtain first cell images of the sample to be tested;
identify and analyze the first cell images obtained in the assigned analysis mode; and
control the imaging device to image the sample smear of the sample to be tested again in an additional analysis mode, if it is identified that there are cells in the first cell images that meet a preset condition, to obtain second cell images of the sample to be tested, wherein the additional analysis mode is an analysis mode that is different from the assigned analysis mode and related to the cells that meet the preset condition.

Through the disclosure, if an abnormality is found during processing of the sample smear in the assigned analysis mode, the additional analysis mode that matches the abnormality and is different from the assigned analysis mode is automatically added and then used for processing.

In some embodiments, the imaging device 101 is configured to image the sample smear of the sample to be tested in the assigned analysis mode, to obtain cell images (also referred to as the first cell images) of the sample to be tested, for example, for identification and analysis by the control device to determine whether there is an abnormality (also referred to as a first abnormality) in the sample smear that corresponds to the assigned analysis mode.

The sample to be tested may be a blood sample, a body fluid sample, and other samples that need to be retested by the cell image analysis device.

The sample to be tested may be any user-specified sample, including a blood sample and a body fluid sample. The sample to be tested may alternatively be a sample that is screened and then re-extracted for retesting after being detected by a blood cell analysis device in various cell count tests (such as blood routine examination). Sample screening may be performed by the control device 102 or an apparatus capable of communicating with the cell image analysis device based on a sample test result from the blood cell analysis device. One screening method is as follows: A sample to be tested is screened based on a sample test result and a preset retest condition; when a test result of a sample meets the preset retest condition, the sample having the test result will be re-extracted and determined as the sample to be tested. For example, when the test result of the sample to be tested, which is obtained by the blood cell analysis device, indicates that there may be a first abnormality in the sample to be tested, it is needed to use the cell image analysis device to image and analyze a sample smear prepared from the sample to be tested in the assigned analysis mode corresponding to the first abnormality.

The preset retest condition is used to indicate at least one of the followings: the test result includes an abnormal result indicating that there is an abnormality in the sample, the test result includes parameters of specific types of cells, a subject having the test result is a preset object of interest, and the sample corresponding to the test result is from a specific department. The foregoing parameters of specific types of cells include, but are not limited to, parameters of leukocytes, the preset object of interest may be, but not limited to, a patient with a leukocyte disease, and the specific department may be, but not limited to, a reproductive medicine department, etc. The parameters of the specific type of cells, the preset object of interest, and the specific department may be determined according to medical needs, and are not limited in this embodiment.

For example, the preset retest condition includes that a number of leukocytes (WBC count)<2. If a sample is tested by the blood cell analysis device, and a WBC count value in the test result is 1 in units of $10^9$/L, then the test result of the sample triggers the preset retest condition, and the sample is a sample to be tested that needs to be retested by the cell image analysis device.

After the sample to be tested is determined, the cell image analysis device can obtain a sample smear of the sample to be tested that is prepared by a smear preparation device, and the imaging device 101 in the cell image analysis device images the sample smear of the sample to be tested in the assigned analysis mode, wherein the assigned analysis mode at least gives an imaging condition of imaging the sample smear by the imaging device 101, and the imaging condition includes at least one of an imaging position, an imaging region, and an imaging number (also referred to as a number of fields of view to be imaged, or a cumulative imaging number of different fields of view, that is, a total number of different fields of view to be imaged by the imaging device) of imaging the sample smear, to indicate that cell images captured by the imaging device 101 are consistent with cell images required in the assigned analysis mode.

Methods for determining the assigned analysis mode include, but are not limited to, the following two methods.

One method is as follows: the control device 102 determines an analysis mode selected by a user as the assigned analysis mode. For example, the cell image analysis device further includes a human-machine interaction device, such as a display, a camera, or a microphone, through which a human-machine interaction instruction is responded to set the assigned analysis mode in advance through user intervention before imaging the sample smear; alternatively, the analysis mode selected by the user is sent to the control device 102 remotely. The so-called "remotely" means that a terminal for selecting the analysis mode is in communication connection with the cell image analysis device, and the user selects the analysis mode on the terminal and then sends the selected analysis mode to the control device. For example, the user specifies a blood leukocyte analysis mode and a blood erythrocyte analysis mode as the assigned analysis mode, or the user specifies only the blood leukocyte analysis mode as the assigned analysis mode.

The other method is as follows: the control device 102 selects an analysis mode based on at least one of test result information of the sample to be tested and sample information of the sample to be tested, and determines the selected analysis mode as the assigned analysis mode, thereby realizing automatic determination of the assigned analysis mode. If the test result information of the sample to be tested can indicate that the first abnormality occurs in the sample to be tested, an analysis mode matching the first abnormality is selected as the assigned analysis mode. The test result information of the sample to be tested may be test result information outputted after testing the sample by the blood cell analysis device. The sample information of the sample to be tested includes at least one of sample type information and subject information. A matching analysis mode is selected as the assigned analysis mode based on at least one of the sample type information and the subject information.

The control device 102 is configured to:
identify and analyze the cell images of the sample to be tested that is captured by the imaging device, that is, the first cell images obtained in the assigned analysis mode; and
if it is identified that there is another abnormality (hereinafter referred to as a second abnormality) in the sample smear that is different from the abnormality (first abnormality) corresponding to the assigned analysis mode, determine an analysis mode corresponding to the second abnormality as the additional analysis mode. It should be noted that, the second abnormality in the disclosure may indicate that a pointed object may be suspected to have abnormality or the pointed object has abnormality. Such a second abnormality cannot be accurately identified by analyzing the first cell images obtained in the assigned analysis mode. For this reason, an analysis mode different from the assigned analysis mode and matching the second abnormality may be added, to better determine whether there is a second abnormality in the sample to be tested, and to identify the second abnormality more accurately.

In some embodiments, the second abnormality indicates that there are cells that meet the preset condition, such as aggregated platelet cells, and erythrocytes infected with plasmodium, which will be described in detail below.

It may be understood that the analysis of the first cell image may be performed after capturing a preset number of first cell images, or may be performed synchronously with the capturing of the first cell image.

The control device 102 is further configured to control the imaging device to image the sample smear in the additional analysis mode, to obtain second cell images of the sample to be tested, so as to further identify and analyze the captured second cell images.

It may be understood that the first cell images include at least one cell image captured by the imaging device in the assigned analysis mode or a cell image formed by combining a plurality of cell images captured by the imaging device in the assigned analysis mode, and the second cell images includes at least one cell image captured by the imaging device in the additional analysis mode or a cell image formed by combing a plurality of cell images captured by the imaging device in the additional analysis mode.

The first abnormality corresponding to the assigned analysis mode and the second abnormality are two different types of abnormalities and can relate to different analysis modes, and the two different types of abnormalities may be two types of abnormalities for different types of cells. For example, the first abnormality corresponding to the assigned analysis mode is for leukocytes, and the second abnormality is for erythrocytes. In this case, the control device 102 may continue to select an analysis mode corresponding to the second abnormality as the additional analysis mode. For example, when the test result of the sample to be tested obtained by the blood cell analysis device indicates that there may be abnormal erythrocytes (the first abnormality) in the sample to be tested, such as erythrocytes infected with plasmodium, the cell image analysis device is triggered to image the sample smear of the sample to be tested in the assigned analysis mode corresponding to the abnormal erythrocytes (the blood erythrocyte analysis mode described below), to obtain the first cell images; and when the cells that meet the preset condition, such as aggregated platelet cells, are identified by analyzing the first cell images, the cell image analyzer is triggered to image the sample smear again in the additional analysis mode (such as the platelet aggregation analysis mode described below), to obtain the second cell images.

The first abnormality corresponding to the foregoing assigned analysis mode and the second abnormality may be abnormalities for the same type of cells but may correspond to different analysis modes. For example, the first abnormality corresponding to the assigned analysis mode is for leukocytes, and the second abnormality is also for leukocytes, but in this case, the analysis mode corresponding to the second abnormality is not the assigned analysis mode. In this case, the control device 102 may also continue to select the analysis mode corresponding to the second abnormality as the additional analysis mode. For example, the first abnormality corresponding to the assigned analysis mode indicates a low leukocyte count for a leukocyte type, and the second abnormality indicates abnormal leukocytes for the leukocyte type, such as abnormal giant leukocytes. When the test result of the sample to be tested that is obtained by the blood cell analysis device indicates that there may be a low leukocyte count (the first abnormality) in the sample to be tested, the cell image analysis device is triggered to image the sample smear of the sample to be tested in the assigned analysis mode corresponding to the low leukocyte count (the blood leukocyte analysis mode described below), to obtain the first cell images; and when the cells that meet the preset condition, such as abnormal giant leukocytes, are identified by analyzing the first cell images, the cell image analyzer is triggered to image the sample smear again in the additional analysis mode (such the abnormal leukocyte analysis mode described below), to obtain the second cell images.

If the first abnormality corresponding to the assigned analysis mode and the second abnormality relate to different analysis modes, the additional analysis mode is different from the assigned analysis mode in terms of name, and at least one of a corresponding imaging condition and analysis requirement in the additional analysis mode is also different from that in the assigned analysis mode. In this case, the control device 102 may control the imaging device to perform imaging based on the imaging condition and/or the analysis requirement in the additional analysis mode.

After the imaging device 101 captures the second cell images in the additional analysis mode, the control device 102 may continue to identify and analyze the second cell images. If it is identified during the identification and analysis that there is a third abnormality in the sample smear that is different from abnormalities corresponding to the assigned analysis mode and the additional analysis mode, the control device 102 may further select an analysis mode corresponding to the third abnormality as another additional analysis mode, and then control the imaging device 101 to continue to perform imaging in another additional analysis mode.

In some embodiments, the control device may control the imaging device by means of: enabling the imaging device to continue to use the additional analysis mode to image the sample smear, after imaging, identifying and analyzing the sample smear in the assigned analysis mode. That is, the imaging device may sequentially perform imaging in the assigned analysis mode and the additional analysis mode to obtain the first cell images and the second cell images, so that various abnormalities in the sample to be tested may be rechecked in one retest, which improves the processing effect and the accuracy of processing results.

In the case that the imaging device respectively obtains the first cell images in the assigned analysis mode and the second cell images in the additional analysis mode, the first cell images obtained in the assigned analysis mode and the second cell images obtained in the additional analysis mode may be displayed differently, and thus the first cell images obtained in the assigned analysis mode and the second cell images obtained in the additional analysis mode are displayed in a differentiated way. For example, the first cell images obtained in the assigned analysis mode are displayed in a common image display mode, while the second cell images obtained in the additional analysis mode are displayed in the form of at least one of highlighting, a preset color border, a cell image name, and a preset text. Certainly, alternatively, the first cell images obtained in the assigned analysis mode may be highlighted, and the second cell images obtained in the additional analysis mode may be displayed commonly.

Alternatively or additionally, the identification and analysis result corresponding to the assigned analysis mode and the identification and analysis result corresponding to the additional analysis mode are displayed differently. For example, the identification and analysis result corresponding to the assigned analysis mode and the identification and analysis result corresponding to the additional analysis mode are displayed differently in terms of at least one of test color, text form and text font, for example, black text is used for the identification and analysis result corresponding to the assigned analysis mode, and red text is used for the identification result corresponding to the additional analysis mode.

It can be learned from the description of the foregoing cell image analysis device that, the imaging device 101 images the sample smear of the sample to be tested in the assigned analysis mode, to obtain the first cell images of the sample to be tested; and the control device 102 identifies and analyzes the first cell images of the sample to be tested, and if it is identified that there is a second abnormality in the sample smear that is different from the first abnormality corresponding to the assigned analysis mode, determines an analysis mode corresponding to the second abnormality as the additional analysis mode, and controls the imaging device 101 to image the sample smear in the additional analysis mode, to obtain the second cell images of the sample to be tested, for further identification and analysis of the obtained second cell image, such that if a different second abnormality is found during processing of the sample smear in the assigned analysis mode, the additional analysis mode that matches the second abnormality is automatically added for further processing of the sample smear, thereby realizing automatic addition and calling of an analysis mode. In addition, the additional analysis mode matches the found second abnormality, so that the imaging device can capture the second cell images matching the second abnormality under the guidance of the additional analysis mode, so as to identify and analyze the second cell images matching the second abnormality, thereby improving the processing efficiency and the accuracy of processing results.

In some embodiments, the assigned analysis mode and the additional analysis mode may include one or more analysis modes, and the assigned analysis mode and the additional analysis mode may be as follows.

The assigned analysis mode includes at least one of the following analysis modes: a blood leukocyte analysis mode in which leukocytes in a blood sample smear are imaged and analyzed, a blood erythrocyte analysis mode in which erythrocytes in a blood sample smear are imaged and analyzed, a blood platelet routine analysis mode in which platelets in a blood sample smear are imaged and analyzed, a body-fluid leukocyte analysis mode in which leukocytes in a body-fluid sample smear are imaged and analyzed, a blood platelet aggregation analysis mode in which platelets in a blood sample smear are imaged to identify and analyze aggregation of the platelets, an abnormal leukocyte analysis mode in which leukocytes in a blood sample smear are imaged to identify and analyze abnormal giant cells, a body-fluid erythrocyte analysis mode in which erythrocytes in a body-fluid sample smear are imaged and analyzed, and a whole cell analysis mode in which all cells in a specified region in a sample smear are imaged and analyzed. It should be noted that abnormal giant leukocytes include at least megakaryocytes and large immature leukocytes.

The additional analysis mode includes one or more of the following analysis modes: a blood leukocyte analysis mode, a blood erythrocyte analysis mode, a blood platelet routine analysis mode, a body-fluid leukocyte analysis mode, a body-fluid erythrocyte analysis mode, a whole cell analysis mode, an abnormal leukocyte analysis mode, and a platelet aggregation analysis mode. The additional analysis mode is an analysis mode that is different from the assigned analysis mode and corresponds to the second abnormality.

In these analysis modes such as the blood leukocyte analysis mode, the blood erythrocyte analysis mode, the blood platelet routine analysis mode, the body-fluid leukocyte analysis mode, the body-fluid erythrocyte analysis mode, and the whole cell analysis mode, the process of the imaging device 101 imaging the sample smear is as follows.

Blood Leukocyte Analysis Mode:

The imaging device 101 searches for and determines an imaging region through a low-power objective lens (such as a 10× objective lens) of a first objective lens and a second objective lens. During searching and determination of the imaging region, the low-power objective lens may perform searching by moving from a head portion to a tail portion of the sample smear, to determine the imaging region, wherein the determined imaging region may be, but is not limited to, a monolayer cell region at a junction between the tail portion and a body portion of the sample smear (also referred to as a body-tail junction), and the determined imaging region may include one or more regions.

Leukocytes in the imaging region are scanned and located through the low-power objective lens. The low-power objective lens may scan and locate the leukocytes in a battlement-type manner. For example, the low-power objective lens repeats scanning a plurality of times by moving from a first direction to a second direction and then moving from the second direction to the first direction, to scan and locate each position in the imaging region, wherein the first direction to the second direction and the second direction to the first direction may be a vertical direction from the head portion to the tail portion of the sample smear. The scanned and located leukocytes are imaged through a high-power objective lens (such as a 100× objective lens) of the first objective lens and the second objective lens of the imaging device.

Figure 2:
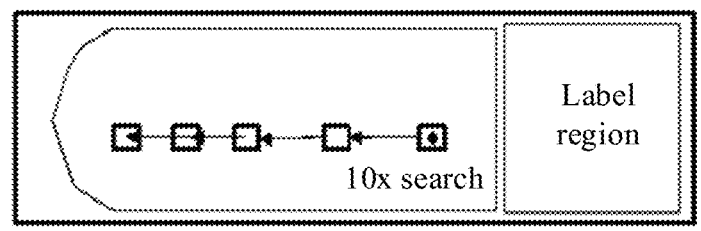
FIGS. 2 to 4 are schematic diagrams respectively showing an optional imaging means in a blood leukocyte analysis mode according to an embodiment of the disclosure.
Figure 3:
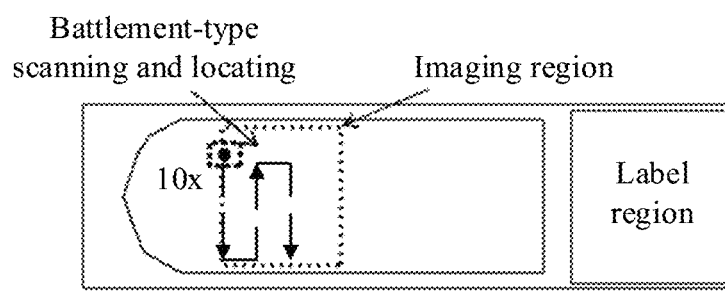
Figure 4:
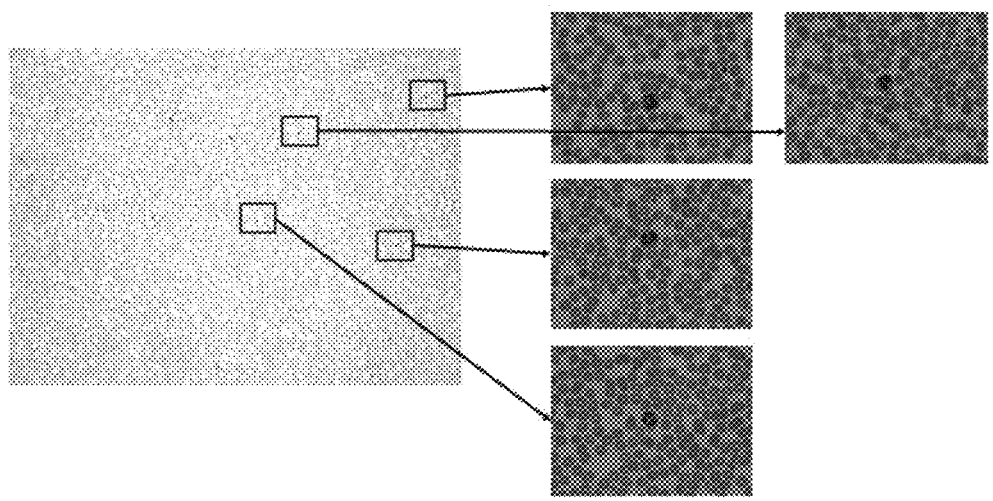

As shown in FIGS. 2 to 4, the 10× objective lens of the imaging device automatically searches from the head portion to the tail portion to determine the imaging region for the sample smear. For example, pointing directions of arrows in FIG. 2 indicate automatic searching from the head portion to the tail portion; then, the leukocytes in the imaging region are scanned and located in a battlement-type manner shown in FIG. 3 through the 10× objective lens; and after the leukocytes are scanned and located, the scanned and located leukocytes are imaged through the 100× objective lens, as shown in FIG. 4, image sharpness in the field of view under the 100× objective lens is improved, and the scanned and located leukocytes are magnified through the 100× objective lens, and are then imaged by a camera of the imaging device, to obtain images of the magnified leukocytes shown in FIG. 10.

Blood Erythrocyte Analysis Mode:

The imaging device searches for and determines an imaging region through a low-power objective lens (such as a 10× objective lens) of a first objective lens and a second objective lens. During searching and determination of the imaging region, the low-power objective lens may perform searching by moving from a head portion to a tail portion of the sample smear, to determine the imaging region, wherein the determined imaging region may be, but is not limited to, a monolayer cell region at a junction of the tail portion and a body portion of the sample smear (a body-tail junction for short), and the determined imaging region may include one or more regions. Erythrocytes in the imaging region are imaged through a high-power objective lens (such as a 100× objective lens) of the first objective lens and the second objective lens of the imaging device.

Figure 5:
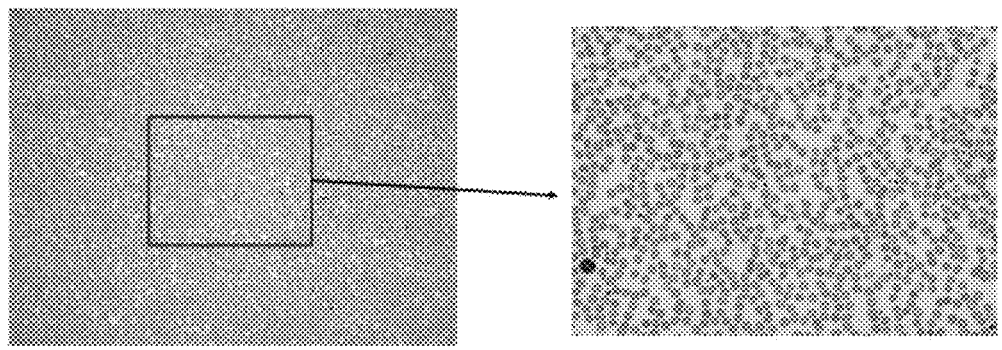
FIG. 5 is a schematic diagram of an optional imaging means in a blood erythrocyte analysis mode according to an embodiment of the disclosure.

As shown in FIG. 5, the imaging region (as shown in a box in FIG. 5) is determined under the 10× objective lens, and the imaging region is then imaged under the 100× objective lens, or an imaging area is set in the imaging region and then a region covered by the imaging area is imaged under the 100× objective lens. A plurality of images may be captured under the 100× objective lens, and there may be an overlap between adjacent images. All images obtained under the 100× objective lens are combined to obtain an image of the imaging region shown in FIG. 5.

Blood Platelet Routine Analysis Mode:

The imaging device searches for and determines an imaging region through a low-power objective lens (such as a 40× objective lens) of a first objective lens and a second objective lens. During searching and determination of the imaging region, the low-power objective lens may perform searching by moving from a head portion to a tail portion of the sample smear, to determine the imaging region, wherein the determined imaging region may be, but is not limited to, a monolayer cell region at a body-tail junction of the sample smear, and the determined imaging region may include one or more regions.

Platelets in the imaging region are imaged through a high-power objective lens (such as a 100× objective lens) of the first objective lens and the second objective lens of the imaging device. The 40× objective lens is used to search for and determine the imaging region in the blood platelet routine analysis mode because a volume of a platelet is relatively small, and dust, etc. with similar volume to a platelet may be mistakenly identified as platelets during searching through the 10× objective lens, resulting in capturing wrong cell images in the blood platelet routine analysis mode, and reducing accuracy.

Figure 6:
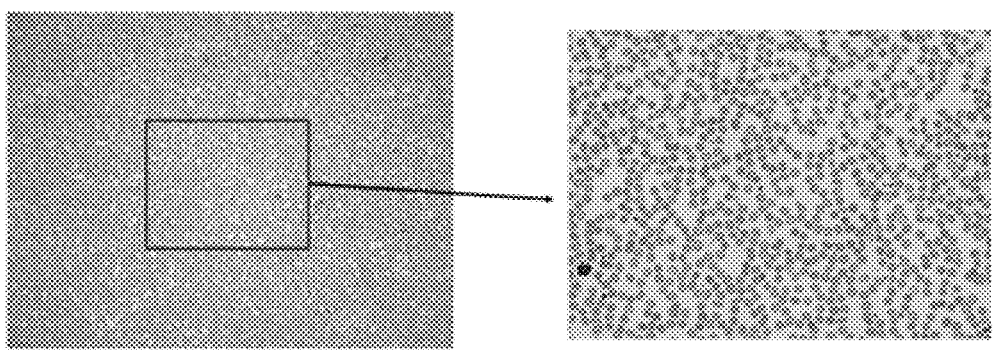
FIG. 6 is a schematic diagram of an optional imaging means in a blood platelet analysis mode according to an embodiment of the disclosure.

As shown in FIG. 6, the imaging region (as shown in a box in FIG. 6) is determined under the 40× objective lens, and the imaging region shown in FIG. 6 is then imaged under the 100× objective lens, or an imaging area is set in the imaging region and then a region covered by the imaging area is imaged under the 100× objective lens. A plurality of images may be captured under the 100× objective lens, and there may be an overlap between adjacent images. All images obtained under the 100× objective lens are combined to obtain an image of the imaging region shown in FIG. 6.

Body-Fluid Leukocyte Analysis Mode:

An imaging region of the sample smear is determined. For a body fluid sample, a region with a specific shape needs to be thrown onto a sample smear of the body fluid sample when preparing the sample smear. Therefore, in the body-fluid leukocyte analysis mode, the imaging region of the sample smear of the body fluid sample needs to be determined based on the region with the specific shape on the sample smear, for example, the imaging region is specified in the region with the specific shape on the sample smear, and an imaging position and an imaging size of the imaging region may be determined by means of human-machine interaction. For example, by performing human-machine interaction on a display interface, a user specifies the imaging position in the region with the specific shape on the sample smear, and specifies the imaging size by extending from the imaging position, to obtain the imaging region. Alternatively, the foregoing imaging region may cover the region with the specific shape on the sample smear, for example, the imaging region includes the region with the specific shape on the sample smear or part of the region with the specific shape on the sample smear.

Leukocytes in the imaging region are scanned and located through a low-power objective lens (such as a 10× objective lens) of a first objective lens and a second objective lens of the imaging device. The low-power objective lens may scan and locate the leukocytes in a battlement-type manner. For example, the low-power objective lens repeats scanning a plurality of times by moving from a first direction to a second direction and then moving from the second direction to the first direction, to scan and locate each position in the imaging region, wherein the first direction to the second direction and the second direction to the first direction may be a vertical direction from a head portion to a tail portion of the sample smear. The scanned and located leukocytes are imaged through a high-power objective lens (such as a 100× objective lens) of the first objective lens and the second objective lens of the imaging device.

Figure 7:
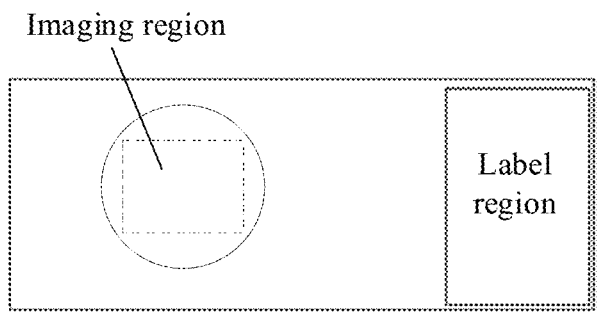
FIGS. 7 to 9 are schematic diagrams respectively showing an optional imaging means in a body-fluid leukocyte analysis mode according to an embodiment of the disclosure.
Figure 8:
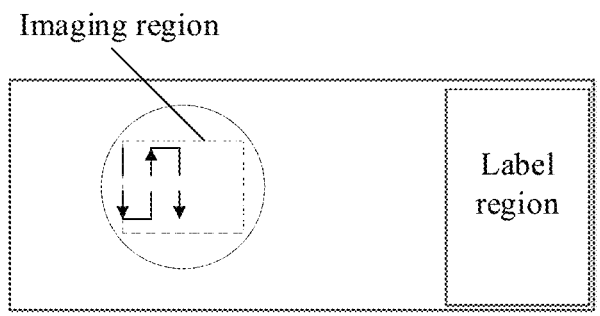
Figure 9:
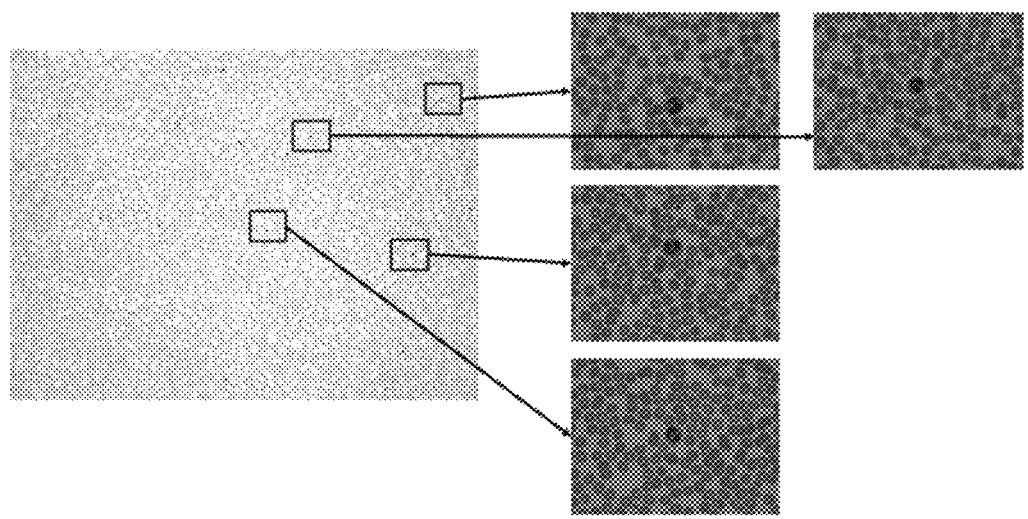

As shown in FIGS. 7 to 9, the imaging device acquires the imaging region specified by the user on the sample smear shown in FIG. 7, and the imaging region is located in the region with the specific shape (such as the circular region shown in FIG. 7) on the sample smear. Leukocytes in the imaging region are scanned and located in the battlement-type manner shown in FIG. 8 through the 10× objective lens of the imaging device. Then, the scanned and located leukocytes are magnified through the 100× objective lens and then imaged by the camera of the imaging device, to obtain images of the magnified leukocytes shown in FIG. 9.

Body-Fluid Erythrocyte Analysis Mode:

An imaging region of the sample smear is determined. The imaging region is imaged through a high-power objective lens (such as a 100× objective lens) of a first objective lens and a second objective lens of the imaging device. For imaging means in the body-fluid erythrocyte analysis mode, reference may be made to the foregoing blood erythrocyte analysis mode.

Whole Cell Analysis Mode:

An imaging region of the sample smear is determined, wherein the imaging region may be a fixed region, the position of which may be preset, or the imaging region may be determined from an image captured through a low-power objective lens (such as the foregoing first objective lens) of the imaging device. The imaging region may alternatively be a non-fixed region. For example, the imaging region may be determined through human-machine interaction. For example, an imaging position and an imaging size, which define the imaging region, are specified by the user, or an imaging position is specified by the user, and an imaging region is automatically determined based on the imaging position. For example, a circular region or a rectangular region is determined with the imaging position as a center. The ways of human-machine interaction may include, but is not limited to, performing human-machine interaction on a display interface, sending a human-machine interaction instruction by way of voice, etc.

After the imaging region is determined, all-region scanning is performed on the imaging region through a high-power objective lens (such as a 100× objective lens) of the first objective lens and the second objective lens of the imaging device, to obtain images of the imaging region under the high-power objective lens. The all-region scanning means scanning each position of the imaging region. When the all-region scanning is performed on the imaging region under the high-power objective lens, because magnification of the high-power objective lens is high such that it is required to perform a plurality of times of scanning under the high-power objective lens to complete the all-region scanning, an image of a scanning region for each scanning under the high-power objective lens may be obtained, and after the last scanning is completed, images obtained through all the scanning are combined into the image of the imaging region under the high-power objective lens according to the scanning sequence.

Figure 10:
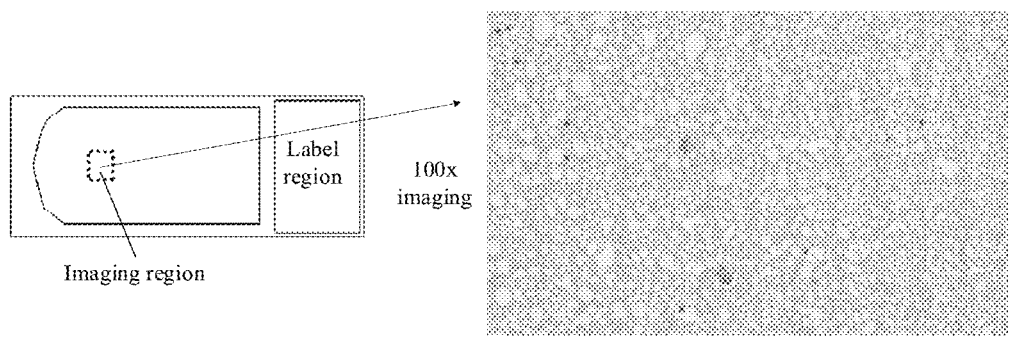
FIG. 10 is a schematic diagram of an optional imaging means in a whole cell analysis mode according to an embodiment of the disclosure.

FIG. 10 shows imaging in the whole cell analysis mode, in which an imaging region is first determined, and then all-region scanning is performed on the imaging region under the 100× objective lens. During the all-region scanning, a plurality of images may be obtained. The plurality of images obtained after the all-region scanning are combined into an image shown in FIG. 10 according to the scanning sequence. In an actual medical treatment process, one or more imaging regions may be determined in the whole cell analysis mode, and all-region scanning is performed on each imaging region, to obtain a combined image for each imaging region. If it is required to combine all the imaging regions into one image, it is also possible to obtain one image corresponding to all the imaging regions through further combination after obtaining the image of each imaging region through combination.

The imaging process of the imaging device 101 in any analysis mode is described above. In some cases, the imaging device 101 may image at least two imaging positions in one analysis mode. For example, if the assigned analysis mode includes at least one of the blood platelet aggregation analysis mode and the abnormal leukocyte analysis mode, the control device 102 is further configured to determine a first imaging position and a second imaging position different from the first imaging position in the blood platelet aggregation analysis mode.

The imaging device is configured to image the first imaging position and the second imaging position on the sample smear in the blood platelet analysis mode, to obtain cell images, so that the imaging device can sequentially or simultaneously image the first imaging position and the second imaging position in the blood platelet analysis mode, to obtain cell images of two different imaging positions, and cell images of more imaging positions may be rechecked.

In the blood platelet aggregation analysis mode and the abnormal leukocyte analysis mode, an imaging process of the imaging device is as follows:

An imaging means under the blood platelet aggregation analysis mode:

The imaging device searches for and determines an imaging region through a low-power objective lens (such as a 40× objective lens) of a first objective lens and a second objective lens. During searching and determination of the imaging region, the low-power objective lens may perform searching by moving from a head portion to a tail portion of the sample smear, to determine the imaging region, wherein the determined imaging region may include, but is not limited to, at least two regions of a monolayer cell region at a body-tail junction of the sample smear, and the tail portion of the sample smear and edges of the sample smear.

Platelets in the imaging region are imaged through a high-power objective lens (such as a 100× objective lens) of the first objective lens and the second objective lens of the imaging device.

Another Imaging Means Under the Blood Platelet Aggregation Analysis Mode:

The imaging device scans and determines an imaging region at the same time through a high-power objective lens (such as a 100× objective lens) of the first objective lens and the second objective lens. If scanning is performed from the middle of the sample smear to edges thereof, positions of the edges may be determined in real time based on images, to complete imaging of the edges; and if scanning is performed from a body-tail junction of the blood smear to a tail portion thereof, a position of the tail portion may be determined in real time based on images, to complete imaging of the tail portion.

In the foregoing two imaging means under the blood platelet aggregation analysis mode, the imaging device may image a relatively large region, which increases a duration of imaging by the imaging device in the blood platelet aggregation analysis mode, but the increase in the imaging region enables the imaging device to obtain more cell images, thereby improving accuracy. Compared with the blood platelet aggregation analysis mode, the blood platelet routine analysis mode has a shortened duration but a reduced accuracy.

An Imaging Means Under the Abnormal Leukocyte Analysis Mode:

The imaging device searches for and determines an imaging region through a low-power objective lens (such as a 10× objective lens) of a first objective lens and a second objective lens. During searching and determination of the imaging region, the low-power objective lens may perform searching by moving from a head portion to a tail portion of the sample smear, to determine the imaging region, wherein the determined imaging region may include, but is not limited to, at least two regions of a monolayer cell region at a body-tail junction of the sample smear, the tail portion of the sample smear and edges of the sample smear.

Leukocytes in the imaging region are imaged through a high-power objective lens (such as a 100× objective lens) of the first objective lens and the second objective lens of the imaging device.

Another Imaging Means Under the Abnormal Leukocyte Analysis Mode:

The imaging device scans and determines an imaging region at the same time through a high-power objective lens (such as a 100× objective lens) of the first objective lens and the second objective lens. If scanning is performed from the middle of the sample smear to edges thereof, positions of the edges may be determined in real time based on images, to complete imaging of the edges; and if scanning is performed from a body-tail junction of the sample smear to a tail portion thereof, a position of the tail portion may be determined in real time based on images, to complete imaging of the tail portion.

When the blood platelet aggregation analysis mode and the abnormal leukocyte analysis mode are introduced in the assigned analysis mode and in the additional analysis mode, that is, when the assigned analysis mode and the additional analysis mode both include the blood platelet aggregation analysis mode and the abnormal leukocyte analysis mode, at least one of the blood platelet aggregation analysis mode and the abnormal leukocyte analysis mode may be directly selected in the assigned analysis mode, or when it is found through analysis that there is a platelet abnormality in the first cell images captured in the assigned analysis mode, the blood platelet aggregation analysis mode may be used as the additional analysis mode, that is, if the second abnormality indicates that there is a platelet abnormality in the sample smear, the control device 102 uses the blood platelet aggregation analysis mode as the additional analysis mode. If it is found through analysis in the assigned analysis mode that there are abnormal giant leukocytes, such as at least one type of megakaryocytes and large immature cells, the abnormal leukocyte analysis mode may be used as the additional analysis mode, that is, if the second abnormality indicates that there are abnormal giant leukocytes in the sample smear, the abnormal leukocyte analysis mode is used as the additional analysis mode.

The platelet abnormality includes at least one of platelet aggregation and low platelet count (for example, a platelet count value is below a normal range). The platelet aggregation is used for indicating that platelets in the sample to be tested are aggregated (for example, aggregated in a specific region). For the platelet abnormality, it is necessary to guide the imaging device to perform imaging in the blood platelet aggregation analysis mode, to identify and analyze whether there is severe platelet aggregation, so as to determine whether the platelet abnormality is caused by platelet aggregation, especially whether the low platelet count is caused by platelet aggregation, to determine whether the low platelet count is pseudo-reduction.

Compared with the assigned analysis mode, analysis requirements in the additional analysis mode may be different from those in the assigned analysis mode. Imaging conditions, such as a number of cells to be imaged, a number of fields of view to be imaged, and a required imaging region, in the additional analysis mode may also be different from those in the assigned analysis mode.

Therefore, to further improve the accuracy of processing results of smear scanning, the additional analysis mode according to the disclosure may be at least one of a number analysis mode, a region analysis mode and a screening analysis mode.

In some embodiments, the additional analysis mode is a number analysis mode, wherein in the assigned analysis mode, the control device is configured to control the imaging device to image the sample smear to identify a first number of target cells; and in the number analysis mode, the control device is configured to control the imaging device to image the sample smear to identify a second number of target cells, and the first number is different from the second number. Preferably, the first number is less than the second number, that is, a number of target cells (for example, a total number of leukocytes) to be identified in the number analysis mode is greater than a number of target cells of the same type (for example, a total number of leukocytes) to be identified in the assigned analysis mode.

Here, the second number of target cells to be identified in the number analysis mode may be obtained only by identifying the second cell images. Alternatively, the second number of target cells to be identified in the number analysis mode is obtained by identifying the first cell images and the second cell images. For example, it is required to identify 100 leukocytes in the assigned analysis mode, and it is required to identify 200 leukocytes in the number analysis mode. In this case, the 200 leukocytes to be identified in the number analysis mode may be directly obtained by the imaging device by imaging the sample smear. Alternatively, the control device first controls the imaging device to image the sample smear in the assigned analysis mode, to obtain 100 leukocytes, and then controls the imaging device to image the sample smear in the number analysis mode again, to obtain the other 100 leukocytes.

In a specific example, the sample to be tested is a blood sample, such as a peripheral blood sample, and the cells meeting the preset condition in the assigned analysis mode are at least one type of leukocytes with abnormal morphology in peripheral blood, erythrocytes with abnormal morphology in peripheral blood and erythrocytes infected with plasmodium. Here, when the control device 102 (for example, a processor thereof) automatically identifies pathological cells (peripheral blood cells with abnormal morphology), such as pathological leukocytes, pathological erythrocytes or erythrocytes infected with plasmodium, by analyzing the first cell images obtained in the assigned analysis mode, that is, when the second abnormality indicates that there may be pathological cells in the sample to be tested, the control device 102 automatically uses the number analysis mode and controls the imaging device 101 to image the sample smear in the number analysis mode, for example, controls the imaging device 101 to image more fields of view than those in the assigned analysis mode, to obtain more cells, thereby increasing the accuracy of a percentage of the pathological cells in a total number of cells. For example, the assigned analysis mode includes a preset first total imaging number of leukocytes, such as 100 leukocytes, that is, the imaging device 101 needs to image 100 leukocytes in the assigned analysis mode. When the control device 102 identifies blast cells or immature cells by analyzing the first cell images, the control device automatically uses the number analysis mode, which includes a second total imaging number of leukocytes, such as 200 or 400 leukocytes, that is greater than the first total imaging number of leukocytes, to more accurately obtain a number and percentage of blast cells or immature cells within 200 or 400 leukocytes.

Further, the number analysis mode may be performed after the assigned analysis mode is completed. Alternatively, when the control device 102 finds pathological cells by analyzing the first cell images during implementation of the assigned analysis mode, the current assigned analysis mode may be stopped and switched to the number analysis mode, that is, the control device 102 controls the imaging device 101 to directly perform imaging in the number analysis mode, instead of the assigned analysis mode. For example, it is required to identify 100 leukocytes in the assigned analysis mode, and it is required to identify 200 leukocytes in the number analysis mode, when the control device finds pathological cells by analyzing the first cell images during implementation of the assigned analysis mode, the control device no longer controls the imaging device to image 100 leukocytes, but directly to image 200 leukocytes.

In some alternative or additional embodiments, the additional analysis mode is a region analysis mode. In the assigned analysis mode, the control device is configured to control the imaging device to image the sample smear in a first region to be imaged, to obtain the first cell images. In the region analysis mode, the control device is configured to control the imaging device to image the sample smear in a second region to be imaged, to obtain the second cell images, wherein the first region to be imaged is different from the second region to be imaged.

Here, the first region to be imaged is a first sample region to be imaged in the assigned analysis mode, and the second region to be imaged is a second sample region to be imaged in the region analysis mode. The first region (or the first sample region) to be imaged and the second region (or the second sample region) to be imaged are different from each other in that: the first region to be imaged and the second region to be imaged are two imaging regions that are completely separate and independent from each other, or the first region to be imaged at least partially overlaps the second region to be imaged.

In an example, if the first region to be imaged at least partially overlaps the second region to be imaged, when the cells that meet the preset condition are erythrocytes infected with plasmodium, in the region analysis mode, the control device is configured to add a new imaging region based on a region that has been imaged in the assigned analysis mode, to determine the second region to be imaged. For example, when the control device 102 automatically identifies pathological cells, such as erythrocytes with abnormal morphology or plasmodium, by analyzing the first cell images obtained in the assigned analysis mode, after the imaging device 101 completes capturing of the first cell images in the assigned analysis mode, the control device automatically uses the region analysis mode in which a imaging region is increased (a total area of fields of view is increased), and controls the imaging device 101 to image the sample smear in the region analysis mode. For example, when erythrocytes with abnormal morphology in peripheral blood or erythrocytes infected with plasmodium are found, the control device 102 controls the imaging device 101 to continuously image 200100× fields of view in the second imaging region, to find plasmodium cells and then calculate a total number of the plasmodium cells, or find various abnormal erythrocytes and then calculate a number or proportion of the abnormal erythrocytes.

In another example, if the first region to be imaged at least partially overlaps the second region to be imaged, when the cells that meet the preset condition are abnormal giant leukocytes, the second region to be imaged includes the first region to be imaged.

It may be understood that, if the first region to be imaged at least partially overlaps the second region to be imaged, the control device 102 may control the imaging device 101 to image the sample smear in at least part of the second region to be imaged. In an example, when the imaging device 101 completes imaging of the first region to be imaged, the control device 102 controls the imaging device 101 to at least image the sample smear in part of the second region to be imaged that does not overlap the first region to be imaged, and also analyze the successively obtained cell images. In another example, the control device 102 controls the imaging device 101 to image the sample smear in the entire region of the second region to be imaged, and analyze the second cell images.

In some embodiments, the second region to be imaged is separate and independent from the first region to be imaged, that is, the first region to be imaged does not overlap the second region to be imaged.

In some embodiments, the cells meeting the preset condition in the assigned analysis mode are aggregated cells, preferably at least one type of aggregated leukocytes, aggregated erythrocytes and aggregated platelets.

In an example, when the assigned analysis mode is a mode other than the platelet routine analysis mode, the control device is configured to, when the aggregated platelets are identified in the assigned analysis mode, control the imaging device to image the sample smear in the region analysis mode, wherein the second region to be imaged includes edges and/or a tail portion of the sample smear.

In another example, when the assigned analysis mode is a platelet routine analysis mode in which platelets in the smear of the sample to be tested are imaged and analyzed, an imaging region of the platelet mode is a body-tail junction of the sample smear. The control device is configured to, when the aggregated platelets are identified in the assigned analysis mode, control the imaging device to image the sample smear in the region analysis mode, wherein the second region to be imaged includes edges and/or a tail portion of the smear.

In other words, when the assigned analysis mode is an analysis mode that is not related to cell aggregation, and the first region to be imaged of the assigned analysis mode does not include the edges and the tail portion of the sample smear, for example, includes only the body portion and/or the body-tail junction of the sample smear, the control device 102 analyzes the first cell images captured in the assigned analysis mode, and if it is identified that there are aggregated cells, especially aggregated platelets in the first cell images, the control device controls the imaging device 101 to image the sample smear in the region analysis mode that has the second region to be imaged, to obtain the second cell images, so as to determine whether there is indeed cell aggregation by analyzing the second cell images, wherein the second region to be imaged includes the edges and/or the tail portion of the sample smear, preferably, the edges and the tail portion of the sample smear. Here, it is particularly preferred that the control device 102 is configured to enable the imaging device 101 to continue to image the sample smear in the region analysis mode after the imaging device completes imaging of the sample smear in the assigned analysis mode.

In another example, when the first region to be imaged of the assigned analysis mode does not include the edges and the tail portion of the sample smear, for example, includes only the body portion and/or the body-tail junction of the sample smear, the control device 102 is configured to analyze the first cell images captured in the assigned analysis mode, and if it is identified that there are abnormal giant leukocytes in the first cell images, control the imaging device 102 to capture the sample smear in the regional analysis mode that has the second region to be imaged, to obtain the second cell images, wherein the second region to be imaged includes the edges and/or the tail portion of the sample smear. Here, it is particularly preferred that the control device 102 is configured to enable the imaging device 101 to continue to image the sample smear in the region analysis mode after the imaging device completes imaging of the sample smear in the assigned analysis mode.

In some embodiments, the control device 102 is further configured to determine a second imaging region (the second region to be imaged) that is different from a first imaging region (the first region to be imaged) in the additional analysis mode, and instruct the imaging device to image the second imaging region on the sample smear, wherein the first imaging region is an imaging region on the sample smear in the assigned analysis mode. The corresponding imaging device 101 further images the second imaging region on the sample smear in the additional analysis mode, to obtain cell images of the second imaging region, and the control device identifies and analyzes the cell images of the second imaging region.

Figure 11:
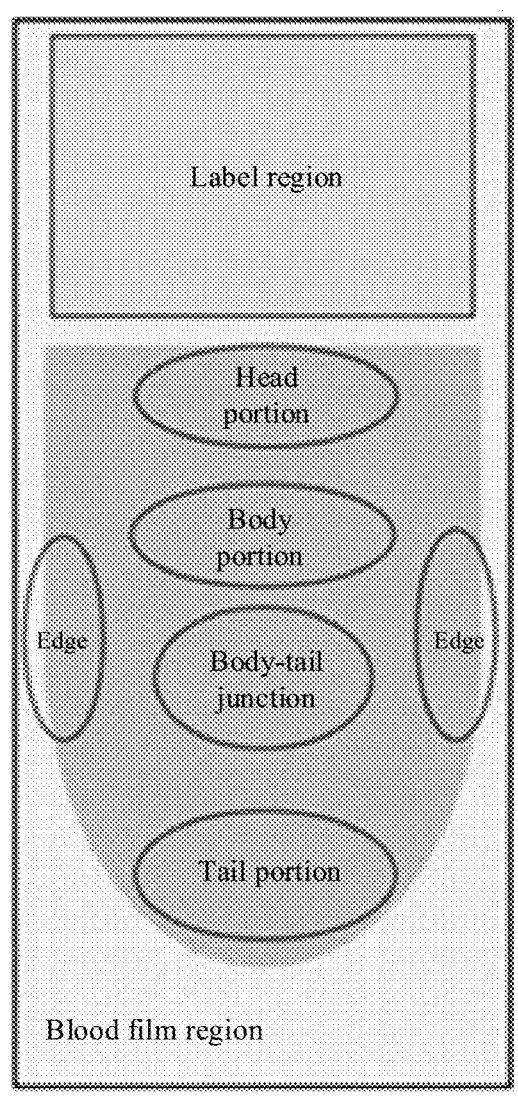
FIG. 11 is an optional schematic diagram of a sample smear according to an embodiment of the disclosure.

The first imaging region and the second imaging region are two different imaging regions on the sample smear. A schematic diagram of each portion in a blood film region on the sample smear is shown in FIG. 11. Regions of one sample smear include: a head portion, a body portion, a body-tail junction, a tail portion, and edges. The first imaging region and the second imaging region may be at least one of these regions, and the first imaging region and the second imaging region are different from each other in that: the first imaging region and the second imaging region are two imaging regions that are completely separate and independent from each other, for example, the first imaging region is the head portion, and the second imaging region is the tail portion. Alternatively, the first imaging region and the second imaging region are different from each other in that: one of the first imaging region and the second imaging region is larger than the other imaging region, for example, the first imaging region is the head portion, and the second imaging region is the head portion and the body portion. Alternatively, the first imaging region and the second imaging region are different from each other in that: the first imaging region partially overlaps the second imaging region, for example, the first imaging region is the head portion and the body portion, and the second imaging region is the body portion and the body-tail junction.

In some embodiments, setting manners of the first imaging region and the second imaging region may be as follows: at least one of the first imaging region and the second imaging region is set in advance, for example, the first imaging region is set by a user in advance, and the second imaging region is obtained based on the first imaging region. A manner of obtaining the second imaging region based on the first imaging region is as follows: the second imaging region is obtained by extending from the first imaging region towards a specified direction, wherein the specified direction may instruct the imaging device to capture cell images matching the second abnormality, that is, the second abnormality may be indicated in the captured cell images. For example, when the second abnormality is platelet aggregation, it is required to image the tail portion and/or the edges of the sample smear, and the specified direction is then a direction toward the tail portion and/or the edges.

In some embodiments, the second imaging region may also be set by the user in advance, or the second imaging region may be specified by the user upon determining that the additional analysis mode needs to be used.

The first imaging region under the foregoing assigned analysis mode may be the body-tail junction of the sample smear, and the corresponding second imaging region is obtained by extending from the body-tail junction along at least one specified direction toward at least one of the tail portion and the edges of the sample smear, so as to extend to or get close to at least one region of the tail portion and the edges corresponding to the body-tail junction of the sample smear as the second imaging region, so that the imaging device may image the tail portion and/or the edge region corresponding to the body-tail junction of the sample smear. Extending along at least one specified direction toward the tail portion and the edges is for determining, by capturing cell images of the tail portion and/or the edges of the sample smear, whether the abnormality in the sample to be tested is caused by aggregation of cells in the sample to be tested at the tail portion and/or the edges. If cells are aggregated at the tail portion and/or the edges, the second abnormality that is different from the first abnormality corresponding to the assigned analysis mode may be rechecked based on that cells are aggregated at the tail portion and/or the edges.

Here, it should be noted that, there are edges at all of the head portion, the body portion, the body-tail junction, and the tail portion of the sample smear. When selecting the edges as the second imaging region, the second imaging region may include at least one region of the tail portion of the sample smear and the edges of the sample smear. The edges of the sample smear may be at least one of all the edges or the edges on both sides of the body-tail junction, for example, at least one of the two edges shown in FIG. 11, and the other edges are not included in the second imaging region.

The second imaging region is automatically determined by using the foregoing method, and cell images matching the second abnormality may be obtained from the automatically determined second imaging region, to recheck the second abnormality by identifying and analyzing the cell images.

Figure 12:
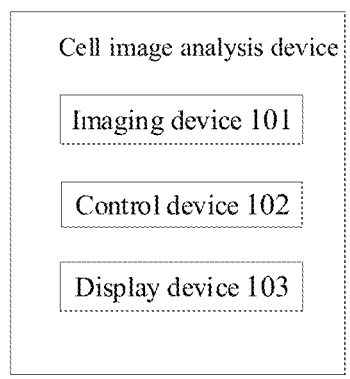
FIG. 12 is a schematic structural diagram of another cell image analysis device according to an embodiment of the disclosure.

In some embodiments, the second imaging region may alternatively be set in other manners, as shown in FIG. 12, which shows an optional structure of another cell image analysis device according to an embodiment of the disclosure. Based on FIG. 1, the cell image analysis device may further include a display device 103.

The display device 103 is configured to display the sample smear. The control device 102 is further configured to obtain an imaging region selected by a user from the displayed sample smear, and use the selected imaging region as the second imaging region, that is, the second imaging region is set by the user, for example, the user selects an imaging region from the displayed sample smear. The selected second imaging region is different from the first imaging region under the assigned analysis mode. For the difference between the first imaging region and the second imaging region, reference may be made to the foregoing description.

In some embodiments, in a process of displaying the sample smear, the display device 103 may further display the first imaging region on the sample smear, so that the user may select the second imaging region with reference to the first imaging region. For example, the first imaging region is the body-tail junction of the sample smear, and the imaging region (that is, the second imaging region) selected by the user is at least one region of the tail portion of the sample smear and the edges of the sample smear.

Because a large number of cells appears at the edges of the sample smear, imaging all the edges of the sample smear may increase working time and also increase cell images irrelevant to the second abnormality. Therefore, the edges of the sample smear that are used as the second imaging region in this embodiment may be the edges of the sample smear that correspond to the body-tail junction. For the description of the edges corresponding to the body-tail junction, reference may be made to the foregoing description.

The cell image analysis device shown in FIG. 12 may enable the user to intervene in selecting the second imaging region, so that the second imaging region may match the second abnormality, thereby increasing the probability of the second abnormality appearing in the captured cell images, and improving imaging accuracy.

In addition, the display device in the cell analysis device shown in FIG. 12 may also display the cell images captured by the imaging device, so that the user may browse the cell images and then perform manual review.

In some alternative or additional embodiments, the additional analysis mode is a screening analysis mode. In the assigned analysis mode, the control device is configured to control the imaging device to image the sample smear to identify a set number of target cells of a first type; and in the screening analysis mode, the control device is configured to control the imaging device to image the sample smear to identify a set number of target cells of a second type, and the target cells of the first type are different from the target cells of the second type. Preferably, the target cells of the second type are a subpopulation of the target cells of the first type.

In some embodiments, the cells that meet the preset condition are specific abnormal lymphocytes, preferably at least one type of cleaved lymphocytes, micronucleated lymphocytes and flower-like lymphocytes.

For example, the first target cells are leukocytes, and the second target cells are lymphocytes. In this case, when the assigned analysis mode is a blood leukocyte analysis mode in which leukocytes in a blood sample smear are imaged and analyzed, the control device is configured to control the imaging device to image the sample smear in the assigned analysis mode, to identify a set number of leukocytes. The control device is further configured to, when specific abnormal lymphocytes are identified from the first cell images, control the imaging device to image the sample smear in the screening and additional analysis mode, to identify a set number of lymphocytes, and then identify, classify and count at least one type of cleaved lymphocytes, micronucleated lymphocytes and flower-like lymphocytes based on the second cell images and optionally the first cell images.

In some embodiments, the control device is further configured to control the imaging device to execute different additional analysis modes for different types of cells that are identified and analyzed in the assigned analysis mode to meet the preset condition.

In some embodiments, the control device is further configured to control the imaging device to execute at least two different additional analysis modes for the same type of cells that are identified in the assigned analysis mode to meet the preset condition.

In an example, the control device is further configured to, when the cells that meet the preset condition are identified in the assigned analysis mode, control the imaging device to respectively image the sample smear in at least two analysis modes of the number analysis mode, the region analysis mode and the screening analysis mode, to obtain the second cell image. The number analysis mode and the assigned analysis mode are different from each other in number of target cells to be identified, the region analysis mode and the assigned analysis mode are different from each other in region to be imaged, and the screening analysis mode and the assigned analysis mode are different from each other in preset number of target cells to be imaged.

In some embodiments, the control device is further configured to output an identification and analysis result in the assigned analysis mode and an identification and analysis result in the additional analysis mode, especially to the foregoing display device for display.

A method for selecting the additional analysis mode is described below by taking a blood sample or a body fluid sample as the sample to be tested. The control device 102 determines the analysis mode corresponding to the second abnormality for the blood sample in the following way, to use an analysis mode matching a cell type for abnormalities of different types of cells in the blood sample:

If the sample to be tested is a blood sample and the second abnormality corresponds to an abnormality in the blood leukocyte analysis mode, the blood leukocyte analysis mode is the analysis mode corresponding to the second abnormality;

if the sample to be tested is a blood sample and the second abnormality corresponds to an abnormality in the blood erythrocyte analysis mode, the blood erythrocyte analysis mode is the analysis mode corresponding to the second abnormality;

if the sample to be tested is a blood sample and the second abnormality corresponds to an abnormality in the blood platelet routine analysis mode, the blood platelet routine analysis mode is the analysis mode corresponding to the second abnormality;

if the sample to be tested is a blood sample and the second abnormality corresponds to an abnormality in the blood platelet aggregation analysis mode, the blood platelet aggregation analysis mode is the analysis mode corresponding to the second abnormality;

if the sample to be tested is a blood sample and the second abnormality corresponds to an abnormality in the whole cell analysis mode, the whole cell analysis mode is the analysis mode corresponding to the second abnormality; and if the sample to be tested is a blood sample and the second abnormality corresponds to an abnormality in the abnormal leukocyte analysis mode, the abnormal leukocyte analysis mode is the analysis mode corresponding to the second abnormality.

The control device 102 determines the analysis mode corresponding to the second abnormality for the body fluid sample in the following way, to use an analysis mode matching a cell type for abnormalities of different types of cells in the body fluid sample:

If the sample to be tested is a body fluid sample and the second abnormality corresponds to an abnormality in the body-fluid leukocyte analysis mode, the body-fluid leukocyte analysis mode is the analysis mode corresponding to the second abnormality;

if the sample to be tested is a body fluid sample and the second abnormality corresponds to an abnormality in the body-fluid erythrocyte analysis mode, the body-fluid erythrocyte analysis mode is the analysis mode corresponding to the second abnormality; and if the sample to be tested is a body fluid sample and the second abnormality corresponds to an abnormality in the whole cell analysis mode, the whole cell analysis mode is the analysis mode corresponding to the second abnormality.

Abnormalities that can be identified by the cell image analysis device are described below. Tables 1 and 2 show abnormalities identified during identification of cell images of leukocytes and cell images of erythrocytes.

TABLE 1

Leukocyte abnormalities identified during identification of cell images of leukocytes

| Serial number | Abnormalities |
|---|---|
| 1 | Metamyelocytes |
| 2 | Myelocytes |
| 3 | Promyelocytes |
| 4 | Abnormal promyelocytes |
| 5 | Promonocytes |
| 6 | Reactive lymphocytes |
| 7 | Blast cells |
| 8 | Abnormal lymphocytes |
| 9 | Plasmacytes |
| 10 | Nucleated red blood cells |
| 11 | Megakaryocytes |

TABLE 2

Erythrocyte abnormalities identified during identification of cell images of erythrocytes

| Serial number | Abnormalities |
|---|---|
| 1 | Erythrocytes with unequal size |
| 2 | Macrocytes |
| 3 | Microcytes |

TABLE 2-continued

Erythrocyte abnormalities identified during identification of cell images of erythrocytes

| Serial number | Abnormalities |
| --- | --- |
| 4 | Hypochromic erythrocytes |
| 5 | Polychromatic erythrocytes |
| 6 | Poikilocytes |
| 7 | Fragmented erythrocytes |
| 8 | Acanthocytes |
| 9 | Degmacytes |
| 10 | Blister cells |
| 11 | Echinocytes |
| 12 | Elliptocytes |
| 13 | Irregularly contracted erythrocytes |
| 14 | Ovalocytes |
| 15 | Drepanocytes |
| 16 | Spherocytes |
| 17 | Stomatocytes |
| 18 | Codocytes |
| 19 | Dacrocytes |
| 20 | Basophilic stippling cells |
| 21 | Howell-Jolly bodies |
| 22 | Pappenheimer bodies |
| 23 | Helmet cells |
| 24 | Parasites |

In the foregoing leukocyte abnormalities, the analysis mode corresponding to blast cells, abnormal lymphocytes, nucleated red blood cells or immature cells is the whole cell analysis mode, wherein the immature cells include five types of cells from "metamyelocytes" to "promonocytes" in Table 1 above. An analysis mode corresponding to megakaryocytes in the white blood cell abnormalities is the abnormal white blood cell analysis mode. For other abnormalities in the white blood cell abnormalities, if the sample to be tested is a blood sample, the corresponding analysis mode is the blood leukocyte analysis mode; and if the sample to be tested is a body fluid sample, the corresponding analysis mode is the body-fluid leukocyte analysis mode. For all abnormalities in the foregoing erythrocyte abnormalities, if the sample to be tested is a blood sample, the corresponding analysis mode is the blood erythrocyte analysis mode; and if the sample to be tested is a body fluid sample, the corresponding analysis mode is the body-fluid erythrocyte analysis mode; if platelet aggregation occurs in the blood sample, the corresponding analysis mode is the blood platelet aggregation analysis mode; and if there are routine platelet abnormalities in the blood sample, the corresponding analysis mode is the blood platelet routine analysis mode. Certainly, the analysis modes corresponding to the foregoing abnormalities may alternatively be adjusted based on retest requirements, for example, the analysis modes corresponding to the abnormalities are changed through user intervention.

Figure 13:
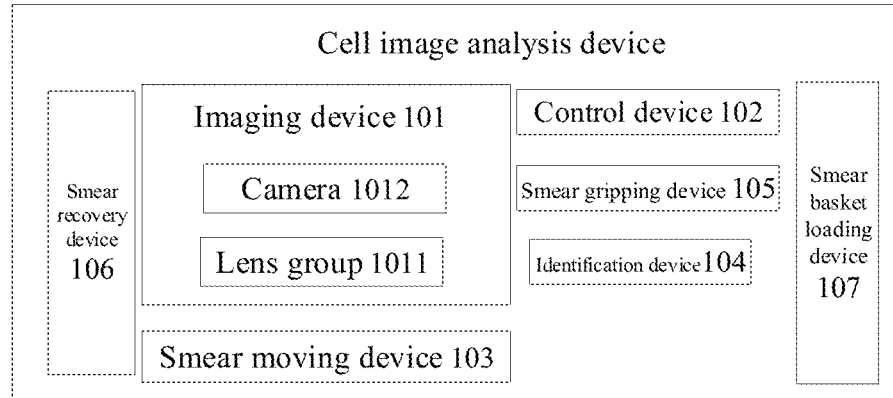
FIGS. 13 and 14 are schematic structural diagrams respectively showing still another cell image analysis device according to an embodiment of the disclosure.
Figure 14:
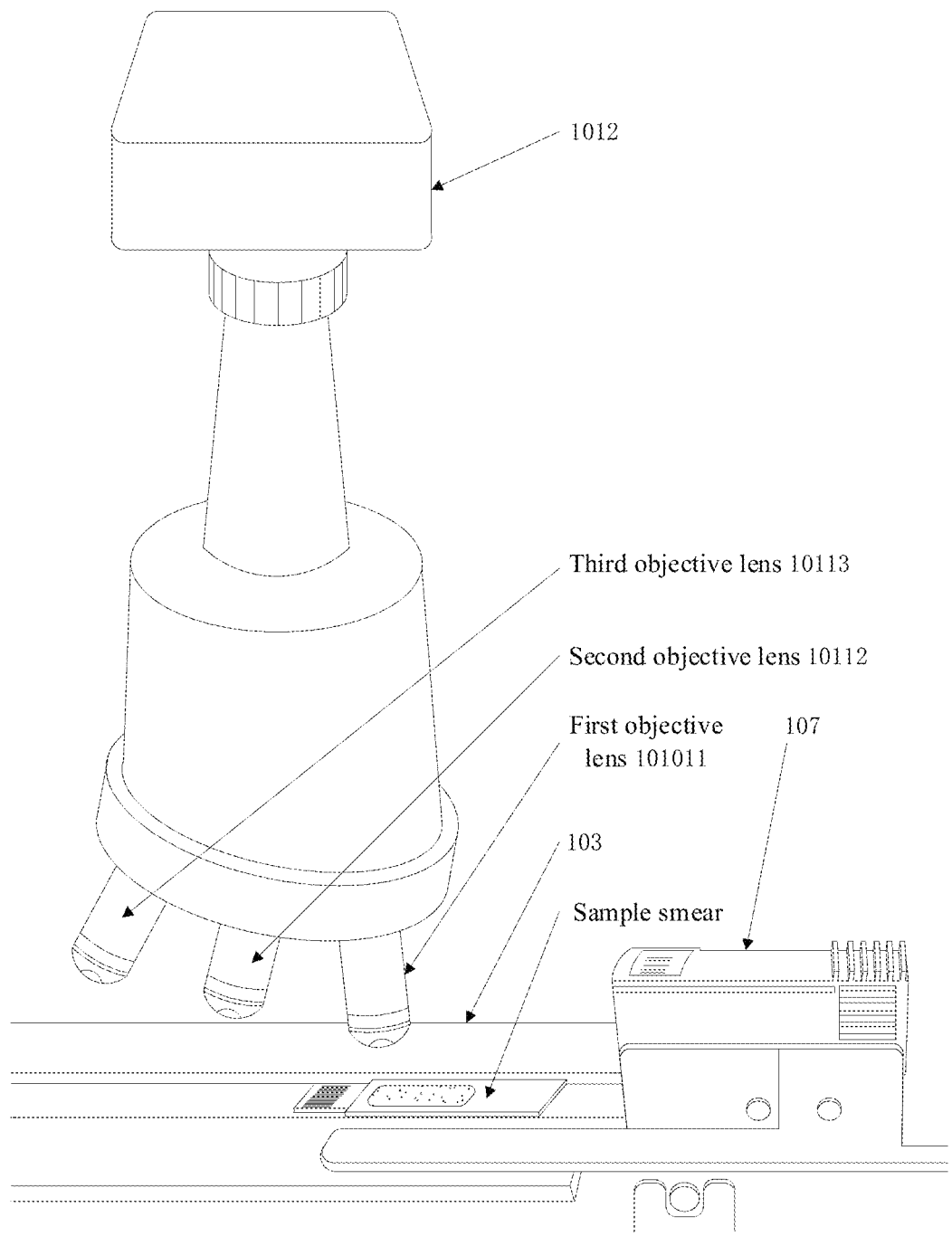

In some embodiments, another optional structure of the foregoing imaging device 101 is shown in FIGS. 13 and 14. The cell image analysis device includes at least an imaging device 101, a control device 102, and a smear moving device 103.

The imaging device 101 includes a camera 1012 and a lens group 1011, and configured to image cells in the sample to be tested that is smeared on the sample smear. The smear moving device 103 is configured to move the sample smear relative to the imaging device 101, so that the imaging device 101 images an imaging region on the sample smear, to obtain cell images. The control device 102 is configured to identify and analyze the cell images of the sample smear.

As shown in FIG. 14, the lens group 1011 may include a first objective lens 10111 and a second objective lens 10112. One of the first objective lens 10111 and the second objective lens 10112 is a low-power objective lens, and the other is a high-power objective lens. For example, the first objective lens 10111 is a low-power objective lens, and the second objective lens 10112 is a high-power objective lens. For example, the first objective lens may be a 10× objective lens, and the second objective lens 10112 may be a 100× objective lens. The lens group 1011 may further include a third objective lens 10113. The power of the third objective lens 10113 is between the power of the first objective lens and the power of the second objective lens. For example, the third objective lens 10113 may be a 40× objective lens.

The cell image analysis device further includes an identification device 104, a smear gripping device 105, and a smear recovery device 106. The identification device 104 is configured to identify sample identification information of the sample smear, and the smear gripping device 105 is configured to grip the sample smear from the identification device 104 onto the smear moving device 103, to drive the sample smear to move relative to the imaging device 101 through the smear moving device 103. Further, after the imaging device 101 captures the cell images of the sample smear, the control device 102 analyzes the cell images of the sample smear, and the smear recovery device 106 is configured to place the sample smear that has been analyzed by the control device 102.

The cell image analysis device further includes a smear basket loading device 107 configured to load a smear basket containing the sample smear to be tested, and the smear gripping device 105 is further configured to grip the sample smear in the smear basket loaded on the smear basket loading device 107 onto the identification device 104 for sample information identification.

Figure 15:
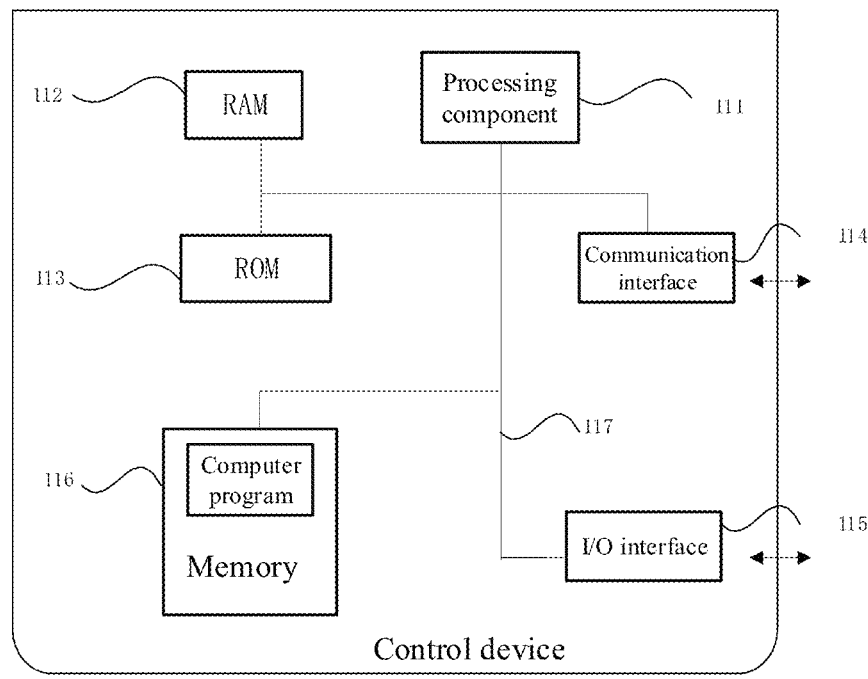
FIG. 15 is a schematic structural diagram of a control device in a cell image analysis device according to an embodiment of the disclosure.

For the foregoing cell image analysis device, an optional structure of the control device in the cell image analysis device is shown in FIG. 15, and includes at least: a processing component 111, a RAM 112, a ROM 113, a communication interface 114, a memory 116, and an I/O interface 115, wherein the processing component 111, the RAM 112, the ROM 113, the communication interface 114, the memory 116 and the I/O interface 115 communicate with each other via a bus 117.

The processing component may be a CPU, a GPU, or other chips having a computing capability.

The memory 116 contains an operating system, and various computer programs such as an application program for execution by the processor component 111, and data required for execution of the computer programs. In addition, during a sample test process, any information that needs to be stored locally may be stored in the memory 116.

The I/O interface 115 is composed of a serial interface such as USB, IEEE 1394, or RS-232C, a parallel interface such as SCSI, IDE, or IEEE 1284, and an analog signal interface composed of a D/A converter, an A/D converter, etc. An input apparatus composed of a keyboard, a mouse, a touchscreen, or other control buttons is connected to the I/O interface 115, and a user may directly input data to the control device 110 by using the input apparatus. In addition, the I/O interface 115 may be further connected to a display with a display function, for example: a liquid crystal display, a touchscreen, an LED display screen, etc., and the control device may output information to the display for display in an image display manner, for example: analysis modes, cell images, etc.

The communication interface 114 may be an interface of any communication protocol currently known. The communication interface 114 communicates with the outside over a network. The control device may communicate data with any device connected over the network through the communication interface 114 based on a communication protocol.

The disclosure further provides a biological sample analysis system, including a blood cell analysis device, a smear preparation device, a cell image analysis device and a control device. The blood cell analysis device is configured to test biological samples to obtain number and type of cells in the biological samples. The smear preparation device is configured to receive a sample to be tested that is selected from the biological samples based on a preset retest condition, and prepare a sample smear from the sample to be tested. The cell image analysis device is configured to image the sample smear to obtain cell images of the sample to be tested, and to identify and analyze the cell images. And the control device is configured to: determine a biological sample, whose test result meets the preset retest condition, to be the sample to be tested, based on test results from the blood cell analysis device; control the sample to be tested to be conveyed to the smear preparation device; control the sample smear of the sample to be tested to be conveyed to the cell image analysis device; control the cell image analysis device to image the sample smear in an assigned analysis mode to obtain first cell images of the sample to be tested, and to identify and analyze the first cell images; and control the cell image analysis device to image the sample smear of the sample to be tested again in an additional analysis mode, if it is identified that there are cells in the first cell images that meet a preset condition, to obtain second cell images of the sample to be tested, wherein the additional analysis mode is an analysis mode that is different from the assigned analysis mode and related to the cells that meet the preset condition. The test results from the blood cell analysis device may include, but is not limited to, number and type of cells in the biological samples.

In some implementations, if it is identified that there are blast cells in the first cell images, a number of leukocytes to be imaged in the additional analysis mode is greater than a number of leukocytes to be imaged in the assigned analysis mode.

In some implementations, the control device is further configured such that: if it is identified that there are erythrocytes infected with plasmodium in the first cell images, a region to be imaged in the additional analysis mode is larger than a region to be imaged in the assigned analysis mode.

In some implementations, the control device is further configured such that: if it is identified that there is at least one type of abnormal lymphocytes of cleaved lymphocytes, micronucleated lymphocytes and flower-like lymphocytes in the first cell images, a number of lymphocytes to be imaged in the additional analysis mode is greater than a number of lymphocytes that have been imaged in the assigned analysis mode.

For other embodiments and advantages of the biological sample analysis system provided in the disclosure, reference may be made to the foregoing description of the cell image analysis device provided in the disclosure, which will not be repeated here.

Figure 16:
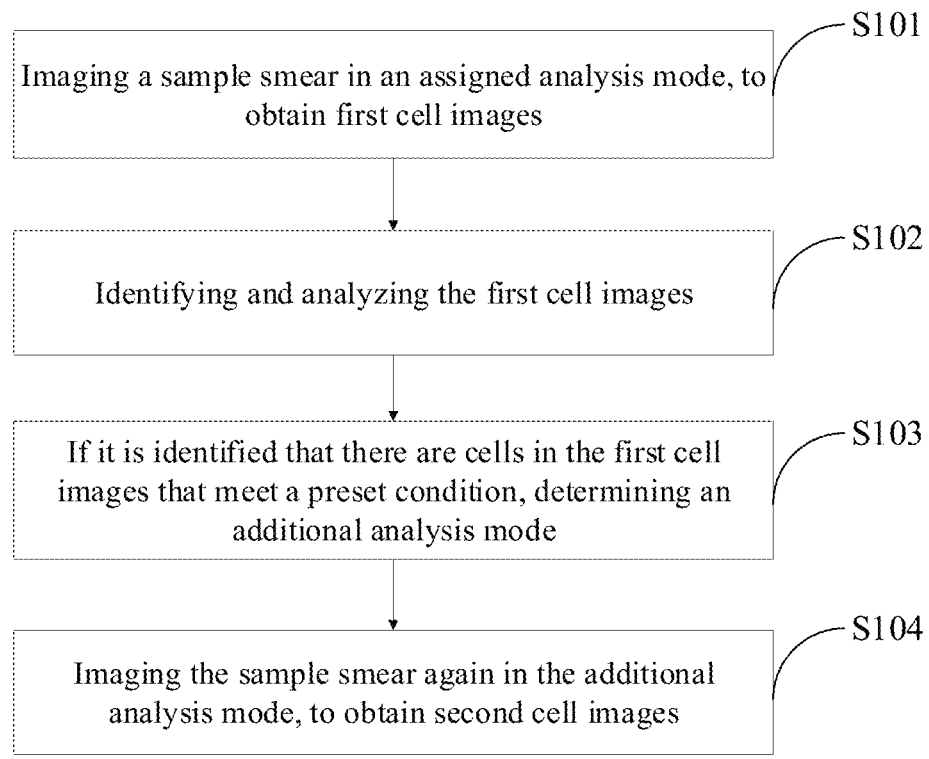
FIG. 16 is a flowchart of a sample analysis method according to an embodiment of the disclosure.

FIG. 16 shows an optional process of a sample analysis method according to an embodiment of the disclosure. The sample analysis method may include the following steps:

S101: imaging a sample smear of a sample to be tested in an assigned analysis mode, to obtain first cell images of the sample to be tested;

S102: identifying and analyzing the first cell images obtained in the assigned analysis mode;

S103: determining an additional analysis mode, if it is identified that there are cells in the first cell images that meet a preset condition, wherein the additional analysis mode is an analysis mode that is different from the assigned analysis mode and related to the cells that meet the preset condition; and S104: imaging the sample smear of the sample to be tested again in the additional analysis mode, to obtain second cell images of the sample to be tested.

In some embodiments, step S101 may include: controlling an imaging device to image the sample smear of the sample to be tested in the assigned analysis mode, to obtain cell images of the sample to be tested, for example, for a control device to identify and analyze whether there is a first abnormality in the sample smear that corresponds to the assigned analysis mode. The assigned analysis mode at least gives an imaging condition of imaging the sample smear by the imaging device 101, for example, the imaging condition includes at least one of an imaging position, an imaging region, an imaging number (for example, a imaging number of a single cell or field of view) and an imaging number of fields of view, etc. when imaging the sample smear, to indicate that cell images captured by the imaging device 101 are consistent with cell images required in the assigned analysis mode.

Methods for determining the assigned analysis mode include, but are not limited to, the following two methods.

One method is as follows: determining an analysis mode selected by a user as the assigned analysis mode. For example, the user specifies a blood leukocyte analysis mode and a blood erythrocyte analysis mode as the assigned analysis mode, or the user specifies only the blood leukocyte analysis mode as the assigned analysis mode.

The other method is as follows: selecting an analysis mode based on at least one of test result information of the sample to be tested and sample information of the sample to be tested, and determining the selected analysis mode as the assigned analysis mode.

In some embodiments, step S102 may include: identifying and analyzing the cell images of the sample to be tested that are captured by the imaging device, that is, the first cell images obtained in the assigned analysis mode, for example, to identify whether there is a second abnormality in the sample smear. Correspondingly, step S103 may include: if it is identified that there is a second abnormality in the sample smear, using an analysis mode corresponding to the second abnormality as the additional analysis mode.

In some embodiments, the second abnormality indicates that there are cells meeting the preset condition, such as aggregated platelets and plasmodium.

The first abnormality corresponding to the assigned analysis mode and the second abnormality are two different types of abnormalities and can relate to different analysis modes, and the two different types of abnormalities may be two types of abnormalities for different types of cells. For example, the first abnormality corresponding to the assigned analysis mode is for leukocytes, and the second abnormality is for erythrocytes. In this case, in this embodiment, it may continue to select the analysis mode corresponding to the second abnormality as the additional analysis mode.

The first abnormality corresponding to the foregoing assigned analysis mode and the second abnormality may be abnormalities for the same type of cells but may correspond to different analysis modes. For example, the first abnormality corresponding to the assigned analysis mode is for leukocytes, and the second abnormality is also for leukocytes, but in this case, the analysis mode corresponding to the second abnormality is not the assigned analysis mode. For example, the first abnormality corresponding to the assigned analysis mode indicates a low leukocyte count for a leukocyte type, and the second abnormality indicates abnormal leukocytes for the leukocyte type, such as abnormal giant leukocytes.

In some embodiments, the imaging device may be controlled in the assigned analysis mode and in the additional analysis mode by means of: enabling the imaging device to continue to use the additional analysis mode to image the sample smear after completion of imaging the sample smear in the assigned analysis mode, that is, the imaging device may sequentially perform imaging in the assigned analysis mode and in the additional analysis mode, so that various abnormalities in the sample to be tested may be rechecked in one retest, which improves the processing effect and the accuracy of processing results.

In some embodiments, step S104 may include: controlling the imaging device to image the sample smear in the additional analysis mode, to obtain second cell images of the sample to be tested, so as to further identify and analyze the imaged second cell images.

It can be learned from the description of the foregoing cell image analysis device that, the imaging device images the sample smear of the sample to be tested in the assigned analysis mode, to obtain the first cell images of the sample to be tested, and the first cell images of the sample to be tested are identified and analyzed. If it is identified that there is a second abnormality in the sample smear, an analysis mode corresponding to the second abnormality is used as the additional analysis mode, and the imaging device is controlled to image the sample smear in the additional analysis mode, to obtain the second cell images of the sample to be tested, for further identification and analysis of the imaged second cell images, such that if a different second abnormality is found during processing of the sample smear in the assigned analysis mode, the additional analysis mode that matches the second abnormality is automatically added for further processing of the sample smear, thereby realizing automatic addition and calling of an analysis mode. In addition, the additional analysis mode matches the found second abnormality, so that the imaging device can capture the second cell images matching the second abnormality under the guidance of the additional analysis mode, so as to identify and analyze the second cell images matching the second abnormality, thereby improving the processing efficiency and the accuracy of processing results.

In some embodiments, the assigned analysis mode and the additional analysis mode may include one or more analysis modes, and the assigned analysis mode and the additional analysis mode may be as follows.

The assigned analysis mode includes at least one of the following analysis modes: a blood leukocyte analysis mode in which leukocytes in a blood sample smear are imaged and analyzed, a blood erythrocyte analysis mode in which erythrocytes in a blood sample smear are imaged and analyzed, a blood platelet routine analysis mode in which platelets in a blood sample smear are imaged and analyzed, a blood platelet aggregation analysis mode in which platelets in a blood sample smear are imaged to identify and analyze aggregation of the platelets, an abnormal leukocyte analysis mode in which leukocytes in a blood sample smear are imaged to identify and analyze abnormal giant cells, a body-fluid leukocyte analysis mode in which leukocytes in a body-fluid sample smear are imaged and analyzed, a body-fluid erythrocyte analysis mode in which erythrocytes in a body-fluid sample smear are imaged and analyzed, and a whole cell analysis mode in which all cells in a specified region in a sample smear are imaged and analyzed.

The additional analysis mode includes one or more of the following analysis modes: a blood leukocyte analysis mode, a blood erythrocyte analysis mode, a blood platelet routine analysis mode, a body-fluid leukocyte analysis mode, a body-fluid erythrocyte analysis mode, a whole cell analysis mode, an abnormal leukocyte analysis mode, and a platelet aggregation analysis mode. The additional analysis mode is an analysis mode different from the assigned analysis mode and corresponding to the second abnormality.

If the assigned analysis mode is the blood platelet routine analysis mode, a process of controlling the imaging device to image the sample smear of the sample to be tested in the assigned analysis mode includes: if the assigned analysis mode is the blood platelet routine analysis mode, an imaging region is searched and determined through a low-power objective lens of the imaging device, and platelets in the imaging region are imaged through a high-power objective lens of the imaging device, wherein the imaging region is a body-tail junction of the sample smear. For details, reference may be made to the foregoing description.

When the blood platelet aggregation analysis mode and the abnormal leukocyte analysis mode are introduced in the assigned analysis mode and in the additional analysis mode, at least one of the blood platelet aggregation analysis mode and the abnormal leukocyte analysis mode may be directly selected under the assigned analysis mode, or when it is found through analysis that there is a platelet abnormality in the first cell images obtained in the assigned analysis mode, the blood platelet aggregation analysis mode may be used as the additional analysis mode, that is, if the second abnormality indicates that there is a platelet abnormality in the sample smear, the blood platelet aggregation analysis mode is used as the additional analysis mode. If it is found through analysis in the assigned analysis mode that there are abnormal giant leukocytes, such as at least one type of megakaryocytes and large immature cells, the abnormal leukocyte analysis mode may be used as the additional analysis mode, that is, if the second abnormality indicates that there are abnormal giant leukocytes in the sample smear, the abnormal leukocyte analysis mode is used as the additional analysis mode.

The platelet abnormality includes at least one of platelet aggregation and low platelet count (for example, a platelet count value is below a normal range). The platelet aggregation is used for indicating that platelets in the sample to be tested are aggregated (for example, aggregated in a specific region). For the platelet abnormality, it is necessary to guide the imaging device to perform imaging in the blood platelet aggregation analysis mode, to identify and analyze whether there is severe platelet aggregation, so as to determine whether the platelet abnormality is caused by platelet aggregation, especially whether the low platelet count is caused by platelet aggregation, to determine whether the low platelet count is pseudo-reduction.

Compared with the assigned analysis mode, analysis requirements in the additional analysis mode may be different from those in the assigned analysis mode. Imaging conditions, such as a number of cells to be imaged, a number of fields of view to be imaged, and a required imaging region, in the additional analysis mode may also be different from those in the assigned analysis mode.

The additional analysis mode according to the disclosure may be at least one of a number analysis mode, a region analysis mode, and a screening analysis mode.

In some embodiments, when the additional analysis mode is a number analysis mode, step S101 includes controlling the imaging device to image the sample smear in the assigned analysis mode, to identify a first number of target cells, and step S104 includes controlling the imaging device to image the sample smear in the number analysis mode, to identify a second number of target cells, wherein the first number is different from the second number. Preferably, the first number is less than the second number.

When the sample to be tested is a blood sample, such as a peripheral blood sample, and the cells meeting the preset condition in the assigned analysis mode are at least one type of leukocytes with abnormal morphology in peripheral blood, erythrocytes with abnormal morphology in peripheral blood and erythrocytes infected with plasmodium, step S103 includes: when pathological cells (peripheral blood cells with abnormal morphology), such as pathological leukocytes, pathological erythrocytes or erythrocytes infected with plasmodium, are automatically identified by analyzing the first cell images obtained in the assigned analysis mode, automatically using the number analysis mode as the additional analysis mode; step S104 includes: controlling the imaging device 101 to image the sample smear in the number analysis mode, for example, controlling the imaging device 101 to image more fields of view than those in the assigned analysis mode, to obtain more cells, thereby increasing the accuracy of a percentage of pathological cells in a total number of cells.

In some embodiments, the number analysis mode may be performed after the assigned analysis mode is completed. Alternatively, when pathological cells are found by analyzing the first cell images during implementation of the assigned analysis mode, the current assigned analysis mode may be stopped and switched to the number analysis mode, that is, the imaging device 101 is controlled to directly perform imaging in the number analysis mode, instead of the assigned analysis mode.

In some alternative or additional embodiments, the additional analysis mode is a region analysis mode. Step S101 includes: controlling the imaging device to image the sample smear in a first region to be imaged under the assigned analysis mode, to obtain the first cell images; step S104 includes: controlling the imaging device to image the sample smear in a second region to be imaged under the region analysis mode, to obtain the second cell images, wherein the first region to be imaged is different from the second region to be imaged.

Here, the first region to be imaged and the second region to be imaged are different from each other in that: the first region to be imaged and the second region to be imaged are two imaging regions that are completely separate and independent from each other, or the first region to be imaged at least partially overlaps the second region to be imaged.

In an example, if the first region to be imaged at least partially overlaps the second region to be imaged, step S103 includes: when erythrocytes infected with plasmodium are identified, adding a new imaging region based on a region that has been imaged in the assigned analysis mode, to determine the second region to be imaged.

In another example, if the first region to be imaged at least partially overlaps the second region to be imaged, when the cells that meet the preset condition are abnormal giant leukocytes, the second region to be imaged includes the first region to be imaged.

In some embodiments, the second region to be imaged is separate and independent from the first region to be imaged, that is, the first region to be imaged does not overlap the second region to be imaged.

In some embodiments, the cells meeting the preset condition in the assigned analysis mode are aggregated cells, preferably at least one type of aggregated leukocytes, aggregated erythrocytes and aggregated platelets.

In an example, when the assigned analysis mode is a mode other than a platelet routine analysis mode, step S104 includes: when the aggregated platelets are identified in the assigned analysis mode, controlling the imaging device to image the sample smear in the region analysis mode, wherein the second region to be imaged includes edges and/or a tail portion of the sample smear.

In another example, when the assigned analysis mode is a platelet routine analysis mode in which platelets in the sample smear be tested are imaged and analyzed, and an imaging region in the platelet routine analysis mode is a body-tail junction of the sample smear, step S104 includes: when the aggregated platelets are identified in the assigned analysis mode, controlling the imaging device to image the sample smear in the region analysis mode, wherein the second region to be imaged includes edges and/or a tail portion of the smear.

In some embodiments, the sample analysis method may further include the following steps:

determining a second imaging region in the additional analysis mode that is different from a first imaging region, and instructing the imaging device to image the second imaging region on the sample smear, wherein the first imaging region is an imaging region on the sample smear in the assigned analysis mode;

controlling the imaging device to image the second imaging region on the sample smear in the additional analysis mode, to obtain cell images of the second imaging region; and analyzing the cell images of the second imaging region.

The first imaging region and the second imaging region are two different imaging regions on the sample smear, and a difference between the two lies in that: the first imaging region and the second imaging region are two imaging regions that are completely separate and independent from each other, one of the first imaging region and the second imaging region is larger than the other imaging region, or the first imaging region partially overlaps the second imaging region.

In some embodiments, setting manners of the first imaging region and the second imaging region may be as follows: at least one of the first imaging region and the second imaging region is set in advance, for example, the first imaging region is set by a user in advance, and the second imaging region is obtained based on the first imaging region. A manner of obtaining the second imaging region based on the first imaging region is as follows: the second imaging region is obtained by extending from the first imaging region towards a specified direction, wherein the specified direction may instruct the imaging device to capture cell images matching the second abnormality, that is, the second abnormality may be indicated in the captured cell images. For example, when the second abnormality is a platelet-related abnormality, it is required to image the tail portion and/or the edges of the sample smear, and the specified direction is then a direction toward the tail portion and/or the edges.

The first imaging region is the body-tail junction of the sample smear, and the second imaging region may include at least one region of the tail portion of the sample smear and the edges of the sample smear, or the second imaging region is obtained by extending from the body-tail junction along at least one specified direction toward at least one of the tail portion and the edges of the sample smear, so as to extend to or get close to at least one region of the tail portion and the edges corresponding to the body-tail junction of the sample smear as the second imaging region, so that the imaging device may image the tail portion and/or the edges corresponding to the body-tail junction of the sample smear. Extending along at least one specified direction toward the tail portion and the edges is for determining, by capturing cell images of the tail portion and/or the edges of the sample smear, whether an abnormality in the sample to be tested is caused by aggregation of cells in the sample to be tested at the tail portion and/or the edges. If cells are aggregated at the tail portion and/or the edges, the second abnormality may be rechecked based on that cells are aggregated at the tail portion and/or the edges.

In some embodiments, the second imaging region may alternatively be set in other manners, for example, the second imaging region is set by means of user selection, and the corresponding sample analysis method may further include the following steps:

displaying the sample smear; and obtaining an imaging region selected by a user from the displayed sample smear, and using the selected imaging region as the second imaging region.

The selected imaging region is at least one region of the tail portion of the sample smear and the edges of the sample smear. The edges of the sample smear may be edges of the sample smear that correspond to the body-tail junction.

In some alternative or additional embodiments, the additional analysis mode is a screening analysis mode. Step S101 includes: controlling the imaging device to image the sample smear in the assigned analysis mode, to identify a set number of target cells of a first type; and step S104 includes: controlling the imaging device to image the sample smear in the screening analysis mode, to identify a set number of target cells of a second type, wherein the target cells of the second type are a subpopulation of the target cells of the first type.

In some embodiments, the cells meeting the preset condition are specific abnormal lymphocytes, preferably at least one type of cleaved lymphocytes, micronucleated lymphocytes and flower-like lymphocytes.

For example, the first target cells are leukocytes, and the second target cells are lymphocytes. In this case, when the assigned analysis mode is a blood leukocyte analysis mode in which leukocytes in a blood sample smear are imaged and analyzed, step S101 includes: controlling the imaging device to image the sample smear in the assigned analysis mode, to identify a set number of leukocytes; and step S104 includes: when specific abnormal lymphocytes are identified from the first cell images, controlling the imaging device to image the sample smear in the screening analysis mode, to identify a set number of lymphocytes, and then identifying, classifying and counting at least one type of cleaved lymphocytes, micronucleated lymphocytes and flower-like lymphocytes based on the second cell images and optionally the first cell images.

In some embodiments, the method further includes: controlling the imaging device to execute different additional analysis modes for different cells that are identified and analyzed in the assigned analysis mode to meet the preset condition.

In some embodiments, the method further includes: controlling the imaging device to execute at least two different additional analysis modes for the same type of cells that are identified in the assigned analysis mode to meet the preset condition.

In an example, the method may include: when the cells meeting the preset condition are identified in the assigned analysis mode, controlling the imaging device to respectively image the sample smear in at least two analysis modes of the number analysis mode, the region analysis mode and the screening analysis mode, to obtain the second cell images. The number analysis mode and the assigned analysis mode are different from each other in number of target cells to be identified, the region analysis mode and the assigned analysis mode are different from each other in region to be imaged, and the screening analysis mode and the assigned analysis mode are different from each other in preset number of target cells to be imaged.

In some embodiments, the method further includes: outputting an identification and analysis result in the assigned analysis mode and an identification and analysis result in the additional analysis mode, especially to the foregoing display device for display.

Selection of the additional analysis mode is described below. In some embodiments, the additional analysis mode may be selected in at least one of the following manners:

If the sample to be tested is a blood sample and the second abnormality corresponds to an abnormality in the blood leukocyte analysis mode, the blood leukocyte analysis mode is the analysis mode corresponding to the second abnormality;

if the sample to be tested is a blood sample and the second abnormality corresponds to an abnormality in the blood erythrocyte analysis mode, the blood erythrocyte analysis mode is the analysis mode corresponding to the second abnormality;

if the sample to be tested is a blood sample and the second abnormality corresponds to an abnormality in the blood platelet routine analysis mode, the blood platelet routine analysis mode is the analysis mode corresponding to the second abnormality;

if the sample to be tested is a blood sample and the second abnormality corresponds to an abnormality in the blood platelet aggregation analysis mode, the blood platelet aggregation analysis mode is the analysis mode corresponding to the second abnormality;

if the sample to be tested is a blood sample and the second abnormality corresponds to an abnormality in the whole cell analysis mode, the whole cell analysis mode is the analysis mode corresponding to the second abnormality; and if the sample to be tested is a blood sample and the second abnormality corresponds to an abnormality in the abnormal leukocyte analysis mode, the abnormal leukocyte analysis mode is the analysis mode corresponding to the second abnormality.

If the sample to be tested is a body fluid sample and the second abnormality corresponds to an abnormality in the body-fluid leukocyte analysis mode, the body-fluid leukocyte analysis mode is the analysis mode corresponding to the second abnormality;

if the sample to be tested is a body fluid sample and the second abnormality corresponds to an abnormality in the body-fluid erythrocyte analysis mode, the body-fluid erythrocyte analysis mode is the analysis mode corresponding to the second abnormality; and if the sample to be tested is a body fluid sample and the second abnormality corresponds to an abnormality in the whole cell analysis mode, the whole cell analysis mode is the analysis mode corresponding to the second abnormality.

Through the selection of the foregoing additional analysis mode, a matching analysis mode can be determined for an abnormality of any type of cells in the blood sample and the body fluid sample, thereby improving the processing efficiency and processing accuracy.

In some embodiments, the sample analysis method may further include the following steps:

displaying the first cell image obtained in the assigned analysis mode and the second cell image obtained in the additional analysis mode in different display manners; and/or displaying an identification and analysis result corresponding to the assigned analysis mode and an identification and analysis result corresponding to the additional analysis mode in different display manners. Reference may be made to the foregoing description for details, which will not be repeated in this embodiment.

The disclosure further provides a cell image analysis method for a blood smear. The method includes the following steps:

providing a blood smear smeared with a blood film prepared from a sample to be tested;

imaging the blood film in an assigned analysis mode, to obtain first cell images;

identifying and analyzing the first cell images;

determining whether there are cells in the first cell images that meet a preset condition;

if the determination result is yes, imaging the blood film again in an additional analysis mode, to obtain second cell images, wherein the additional analysis mode is different from the assigned analysis mode; and if the determination result is no, outputting an identification and analysis result.

Further, in the foregoing cell image analysis method, after identification and analysis in the assigned analysis mode are completed, the additional analysis mode is activated.

In addition, in the foregoing cell image analysis method, if the determination result is yes, the assigned analysis mode is interrupted and then switched to the additional analysis mode to image the blood film again.

In some embodiments, the additional analysis mode is at least one of a number analysis mode, a region analysis mode and a screening analysis mode, wherein the number analysis mode and the assigned analysis mode are different in number of target cells to be identified, the region analysis mode and the assigned analysis mode are different in region to be imaged, and the screening analysis mode and the assigned analysis mode are different in preset number of target cells to be imaged.

An embodiment of the disclosure further provides a storage medium having stored thereon executable instructions, which is configured to cause a processor to execute the executable instructions to implement the foregoing sample analysis method and/or cell image analysis method for a blood smear.

The disclosure further provides a cell image analysis device, including:

an imaging device configured to image a sample smear of a sample to be tested in an assigned analysis mode, to obtain cell images of the sample to be tested, for a control device to identify and analyze whether there is an abnormality in the sample smear that corresponds to the assigned analysis mode; and the control device configured to:

identify and analyze the cell images of the sample to be tested that is captured by the imaging device;

if it is identified that there is other abnormality in the sample smear that is different from the abnormality corresponding to the assigned analysis mode, determine an analysis mode corresponding to the other abnormality as an additional analysis mode; and control the imaging device to image the sample smear in the additional analysis mode, to further identify and analyze captured cell images.

Further, the control device is configured to enable the imaging device to continue to use the additional analysis mode to image the sample smear, after completion of imaging the sample smear in the assigned analysis mode.

Further, the control device is configured to determine an analysis mode selected by a user as the assigned analysis mode.

Further, the control device is configured to select an analysis mode based on at least one of test result information of the sample to be tested and sample information of the sample to be tested, and determine the selected analysis mode as the assigned analysis mode.

Further, the assigned analysis mode further includes at least one of the following analysis modes: a blood leukocyte analysis mode in which leukocytes in a blood sample smear are imaged and analyzed, a blood erythrocyte analysis mode in which erythrocytes in a blood sample smear are imaged and analyzed, a blood platelet routine analysis mode in which platelets in a blood sample smear are imaged and analyzed, a blood platelet aggregation analysis mode in which platelets in a blood sample smear are imaged to identify and analyze aggregation of the platelets, an abnormal leukocyte analysis mode in which leukocytes in a blood sample smear are imaged to identify and analyze abnormal giant cells, a body-fluid leukocyte analysis mode in which leukocytes in a body-fluid sample smear are imaged and analyzed, a body-fluid erythrocyte analysis mode in which erythrocytes in a body-fluid sample smear are imaged and analyzed, and a whole cell analysis mode in which all cells in a specified region on a sample smear are imaged and analyzed.

Further, the additional analysis mode includes one or more of the following analysis modes: a blood leukocyte analysis mode, a blood erythrocyte analysis mode, a blood platelet routine analysis mode, a body-fluid leukocyte analysis mode, a body-fluid erythrocyte analysis mode, a whole cell analysis mode, an abnormal leukocyte analysis mode, and a blood platelet aggregation analysis mode. The additional analysis mode is an analysis mode different from the assigned analysis mode and corresponding to the other abnormality.

Further, if the assigned analysis mode is the blood platelet routine analysis mode, when imaging the sample smear of the sample to be tested in the assigned analysis mode to obtain cell images of the sample to be tested, the imaging device is further configured to: in the blood platelet routine analysis mode, search for and determine an imaging region through a low-power objective lens of the imaging device, and image platelets in the imaging region through a high-power objective lens of the imaging device. The imaging region is a body-tail junction of the sample smear.

Further, the control device is further configured to: when determining, if it is identified that there is other abnormality in the sample smear that is different from the abnormality corresponding to the assigned analysis mode, an analysis mode corresponding to the other abnormality as the additional analysis mode:
  if the other abnormality indicates that there is a platelet abnormality in the sample smear, determine the blood platelet aggregation analysis mode as the additional analysis mode.

Further, the control device is further configured to: when determining, if it is identified that there is other abnormality in the sample smear that is different from the abnormality corresponding to the assigned analysis mode, an analysis mode corresponding to the other abnormality as the additional analysis mode:
  if the other abnormality indicates that there are abnormal giant leukocytes in the sample smear, determine the abnormal leukocyte analysis mode as the additional analysis mode.

Further, the control device is further configured to determine a second imaging region in the additional analysis mode that is different from a first imaging region, and instruct the imaging device to image the second imaging region on the sample smear, wherein the first imaging region is an imaging region on the sample smear in the assigned analysis mode; and
  the imaging device is further configured to: when imaging the sample smear of the sample to be tested in the assigned analysis mode to obtain cell images of the sample to be tested: image the second imaging region on the sample smear in the additional analysis mode, to obtain cell images of the second imaging region.

The control device is further configured to: when identifying and analyzing the captured cell images: identify and analyze the cell images of the second imaging region.

Further, the first imaging region is a body-tail junction of the sample smear, and the second imaging region includes at least one region of a tail portion and edges of the sample smear.

Further, the cell image analysis device further includes a display device configured to display the sample smear; and
  the control device is further configured to obtain an imaging region selected by a user from the displayed sample smear, and use the selected imaging region as the second imaging region.

Further, the selected imaging region is at least one region of a tail portion of the sample smear and edges of the sample smear.

Further, the control device is further configured to: when determining, if it is identified that there is other abnormality in the sample smear that is different from the abnormality corresponding to the assigned analysis mode, an analysis mode corresponding to the other abnormality as the additional analysis mode, use at least one of the following manners:
  if the sample to be tested is a blood sample and the other abnormality corresponds to an abnormality in the blood leukocyte analysis mode, the blood leukocyte analysis mode is the analysis mode corresponding to the other abnormality;
  if the sample to be tested is a blood sample and the other abnormality corresponds to an abnormality in the blood erythrocyte analysis mode, the blood erythrocyte analysis mode is the analysis mode corresponding to the other abnormality;
  if the sample to be tested is a blood sample and the other abnormality corresponds to an abnormality in the blood platelet routine analysis mode, the blood platelet routine analysis mode is the analysis mode corresponding to the other abnormality;
  if the sample to be tested is a blood sample and the other abnormality corresponds to an abnormality in the blood platelet aggregation analysis mode, the blood platelet aggregation analysis mode is the analysis mode corresponding to the other abnormality;
  if the sample to be tested is a blood sample and the other abnormality corresponds to an abnormality in the whole cell analysis mode, the whole cell analysis mode is the analysis mode corresponding to the other abnormality; and
  if the sample to be tested is a blood sample and the other abnormality corresponds to an abnormality in the abnormal leukocyte analysis mode, the abnormal leukocyte analysis mode is the analysis mode corresponding to the other abnormality.

Further, the control device is further configured to: when determining, if it is identified that there is other abnormality in the sample smear that is different from the abnormality corresponding to the assigned analysis mode, an analysis mode corresponding to the other abnormality as the additional analysis mode, use at least one of the following manners:
  if the sample to be tested is a body fluid sample and the other abnormality corresponds to an abnormality in the body-fluid leukocyte analysis mode, the body-fluid leukocyte analysis mode is the analysis mode corresponding to the other abnormality;
  if the sample to be tested is a body fluid sample and the other abnormality corresponds to an abnormality in the body-fluid erythrocyte analysis mode, the body-fluid erythrocyte analysis mode is the analysis mode corresponding to the other abnormality; and
  if the sample to be tested is a body fluid sample and the other abnormality corresponds to an abnormality in the whole cell analysis mode, the whole cell analysis mode is the analysis mode corresponding to the other abnormality.

Further, the cell image obtained in the assigned analysis mode and the cell image obtained in the additional analysis mode are displayed differently; and/or an identification and analysis result corresponding to the assigned analysis mode and an identification and analysis result corresponding to the additional analysis mode are displayed differently.

Those skilled in the art should understand that the embodiments of the disclosure may be provided as a method, a system, or a computer program product. Therefore, the embodiments of the disclosure may be implemented in the form of hardware embodiments, software embodiments, or embodiments with a combination of software and hardware. Moreover, the embodiments of the disclosure may be implemented in the form of a computer program product that is implemented on one or more computer-usable storage media (including a disk memory and an optical memory, etc.) that include computer-usable program codes.

The embodiments of the disclosure are described with reference to flowcharts and/or block diagrams of the methods, apparatuses (systems), and computer program products according to the embodiments of the disclosure. It should be understood that each procedure and/or block in the flowcharts and/or block diagrams, and combinations of the procedures and/or blocks in the flowcharts and/or block diagrams may be implemented by computer program operations. These computer program operations may be provided to a processor of a general-purpose computer, a special-purpose computer, an embedded processor or other programmable data processing apparatuses to create a machine, such that the operations executed by the processor of the computer or other programmable data processing apparatuses create a device for implementing functions specified in one or more procedures in the flowcharts and/or one or more blocks in the block diagrams.

These computer program operations may also be stored in a computer-readable memory that may direct a computer or other programmable data processing apparatus to operate in a specific manner, such that the operations stored in the computer-readable memory create a manufacture article including an operation device, and the operation device implements the functions specified in one or more procedures in the flowcharts and/or one or more blocks in the block diagrams.

These computer program operations may also be loaded onto a computer or other programmable data processing apparatuses to enable a series of operation steps to be executed on the computer or other programmable apparatuses to perform computer-implemented processing, such that the operations executed on the computer or other programmable apparatuses provide steps for implementing the functions specified in one or more procedures in the flowcharts and/or one or more blocks in the block diagrams.

The foregoing descriptions are merely the preferred embodiments of the disclosure, and are not intended to limit the scope of protection of the disclosure. Any modifications, equivalent substitutions and improvements made within the spirit and principles of the disclosure shall be included within the scope of protection of the disclosure.

What is claimed is:

1. A cell image analysis device, comprising:
    an imaging device; and
    a control device configured to:
        control the imaging device to image a sample smear of a sample to be tested a first time in an assigned analysis mode to obtain first cell images of the sample to be tested;
        identify and analyze the first cell images obtained in the assigned analysis mode; and
        if it is identified that there are cells in the first cell images that meet a preset condition, control the imaging device to image the sample smear of the sample to be tested a second time in an additional analysis mode to obtain second cell images of the sample to be tested, wherein the cells meeting the preset condition in the assigned analysis mode are at least one type of leukocytes with abnormal morphology in peripheral blood, erythrocytes with abnormal morphology in peripheral blood, erythrocytes infected with plasmodium, and aggregated cells,
    wherein the additional analysis mode is an analysis mode that is different from the assigned analysis mode and related to the cells that meet the preset condition.

2. The cell image analysis device of claim 1, wherein the control device is further configured to enable the imaging device to use the additional analysis mode to image the sample smear, after imaging, identifying, and analyzing the sample smear in the assigned analysis mode.

3. The cell image analysis device of claim 1, wherein the additional analysis mode is a number analysis mode, wherein in the assigned analysis mode, the control device is further configured to control the imaging device to image the sample smear to identify a first number of target cells; in the number analysis mode, the control device is further configured to control the imaging device to image the sample smear to identify a second number of target cells, and the first number is less than the second number.

4. The cell image analysis device of claim 1, wherein in the assigned analysis mode, the control device is further configured to control the imaging device to image the sample smear in a first region to be imaged, to obtain the first cell images; and the additional analysis mode is a region analysis mode, wherein in the region analysis mode, the control device is further configured to control the imaging device to image the sample smear in a second region to be imaged, to obtain the second cell images, wherein the first region to be imaged is different from the second region to be imaged.

5. The cell image analysis device of claim 4, wherein the first region to be imaged at least partially overlaps the second region to be imaged.

6. The cell image analysis device of claim 5, wherein the cells that meet the preset condition are erythrocytes infected with plasmodium, and in the region analysis mode, the control device is further configured to add a new imaging region based on the region that has been imaged in the assigned analysis mode, to determine the second region to be imaged.

7. The cell image analysis device of claim 5, wherein the cells that meet the preset condition are abnormal giant leukocytes, and the second region to be imaged includes the first region to be imaged.

8. The cell image analysis device of claim 4, wherein the second region to be imaged is separate and independent from the first region to be imaged.

9. The cell image analysis device of claim 4, wherein the cells meeting the preset condition in the assigned analysis mode comprise aggregated cells,
    wherein the assigned analysis mode is selected from other modes than a platelet routine analysis mode, and when the aggregated platelets are identified in the assigned analysis mode, the control device is further configured to control the imaging device to image the sample smear in the region analysis mode, wherein the second region to be imaged comprises edges and/or a tail portion of the sample smear; or
    wherein the assigned analysis mode is a platelet routine analysis mode, in which platelets in the sample smear of the sample to be tested are imaged and analyzed, and an imaging region of the platelet routine analysis mode is a junction region between a body portion and a tail portion of the sample smear; and when the aggregated platelets are identified in the assigned analysis mode, the control device is further configured to control the imaging device to image the sample smear in the region analysis mode, wherein the second region to be imaged comprises edges and/or a tail portion of the sample smear.

10. The cell image analysis device of claim 1, wherein the additional analysis mode is a screening analysis mode, wherein in the assigned analysis mode, the control device is further configured to control the imaging device to image the sample smear to identify a set number of target cells of a first type; and in the screening analysis mode, the control device is further configured to control the imaging device to image the sample smear to identify a set number of target cells of a second type, and the target cells of the second type are a subpopulation of the target cells of the first type.

11. The cell image analysis device of claim 10, wherein the cells meeting the preset condition are specific abnormal lymphocytes.

12. The cell image analysis device of claim 11, wherein the target cells of the first type are leukocytes, and the target cells of the second type are lymphocytes; and the assigned analysis mode is a blood leukocyte analysis mode, in which leukocytes in a blood sample smear are imaged and analyzed; in the assigned analysis mode, the control device is further configured to control the imaging device to image the sample smear to identify a set number of leukocytes, and when the specific abnormal lymphocytes are identified, the control device is further configured to control the imaging device to image the sample smear in the additional analysis mode to identify a set number of lymphocytes, and to classify and count at least one type of cleaved lymphocytes, micronucleated lymphocytes, and flower-like lymphocytes.

13. The cell image analysis device of claim 1, wherein the control device is further configured to execute different additional analysis modes for different types of cells that are identified and analyzed in the assigned analysis mode to meet the preset condition; or wherein the control device is further configured to execute at least two different additional analysis modes for one type of cells that are identified in the assigned analysis mode to meet the preset condition.

14. The cell image analysis device of claim 13, wherein when the cells that meet the preset condition are identified in the assigned analysis mode, the control device is further configured to: control the imaging device to image the sample smear respectively in at least two analysis modes of a number analysis mode, a region analysis mode and a screening analysis mode, to obtain the second cell images, wherein the number analysis mode and the assigned analysis mode are different in number of target cells to be identified, the region analysis mode and the assigned analysis mode are different in region to be imaged, and the screening analysis mode and the assigned analysis mode are different in preset number of target cells to be imaged.

15. The cell image analysis device of claim 1, wherein a region to be imaged in the additional analysis mode is determined according to an instruction inputted by a user.

16. A cell image analysis method for a blood smear, comprising:

providing a blood smear smeared with a blood film prepared from a blood sample to be tested;

imaging the blood film a first time in an assigned analysis mode, to obtain first cell images;

identifying and analyzing the first cell images, and determining whether there are cells in the first cell images that meet a preset condition, wherein the cells meeting the preset condition in the assigned analysis mode are at least one type of leukocytes with abnormal morphology in peripheral blood, erythrocytes with abnormal morphology in peripheral blood, erythrocytes infected with plasmodium, and aggregated cells; and if it is identified that there are cells in the first cell images that meet a preset condition imaging the blood film a second time in an additional analysis mode, to obtain second cell images, wherein the additional analysis mode is different from the assigned analysis mode.

17. The method of claim 16, wherein if the determination result is yes, the assigned analysis mode is interrupted and then switched to the additional analysis mode to continue to image the blood film.

18. The method of claim 16, wherein the additional analysis mode is at least one of a number analysis mode, a region analysis mode and a screening analysis mode, wherein the number analysis mode and the assigned analysis mode are different in number of target cells to be identified, the region analysis mode and the assigned analysis mode are different in region to be imaged, and the screening analysis mode and the assigned analysis mode are different in preset number of target cells to be imaged.

* * * * *